US012574965B2

(12) United States Patent
Cavalcanti et al.

(10) Patent No.: US 12,574,965 B2
(45) Date of Patent: Mar. 10, 2026

(54) COMMUNICATION WITHIN SYNCHRONIZED TRANSMISSION OPPORTUNITIES (S-TXOPS) USING SHORT PREAMBLE

(71) Applicant: Intel Corporation, Santa Clara, CA (US)

(72) Inventors: Dave A. Cavalcanti, Portland, OR (US); Dibakar Das, Hillsboro, OR (US); Laurent Cariou, Milizac (FR); Dmitry Akhmetov, Hillsboro, OR (US); Shahrnaz Azizi, Cupertino, CA (US); Xiaogang Chen, Portland, OR (US); Gadi Shor, Tel Aviv (IL); Ehud Reshef, Kiryat Tivon (IL); Juan Fang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 658 days.

(21) Appl. No.: 17/844,237

(22) Filed: Jun. 20, 2022

(65) Prior Publication Data

US 2022/0338260 A1 Oct. 20, 2022

(51) Int. Cl.
    *H04W 74/08* (2024.01)
    *H04W 74/0816* (2024.01)
(52) U.S. Cl.
    CPC ... *H04W 74/0816* (2013.01); *H04W 74/0891* (2013.01)

(58) Field of Classification Search
    CPC ......... H04W 74/0816; H04W 74/0891; H04W 74/0808; H04W 74/006
    See application file for complete search history.

(56) References Cited

U.S. PATENT DOCUMENTS

| | | | | |
|---|---|---|---|---|
| 11,729,035 B2 * | 8/2023 | Takada | ................ | H04L 27/2085 370/329 |
| 12,218,787 B2 * | 2/2025 | Inohiza | .................... | H04J 1/00 |
| 2017/0104565 A1 * | 4/2017 | Seok | .................. | H04L 27/2602 |
| 2019/0349997 A1 * | 11/2019 | Park | ................. | H04W 74/0816 |

(Continued)

FOREIGN PATENT DOCUMENTS

| | | | | |
|---|---|---|---|---|
| EP | 3998752 A1 * | 5/2022 | ........ | H04W 74/0808 |
| WO | WO-2014187086 A1 * | 11/2014 | ........ | H04W 74/0808 |

(Continued)

*Primary Examiner* — Wutchung Chu
(74) *Attorney, Agent, or Firm* — Schwegman Lundberg & Woessner, P.A.

(57) ABSTRACT

An access point station (AP) communicates with a plurality of non-AP stations (STAs) within a synchronized transmission opportunity (S-TXOP). The S-TXOP may comprise an S-TXOP trigger followed by a plurality of S-TXOP slots. After transmission of the S-TXOP trigger, the AP may encode, for transmission within an S-TXOP slot, a downlink (DL) multi-user physical layer protocol data unit (DL MU-PPDU). The DL MU-PPDU may include a preamble followed by a data field. To indicate that a previously signaled resource unit (RU) allocation is to be used during the S-TXOP slot, the AP may encode the preamble to include an allocation ID of the previously signaled RU allocation in a signal field (SIG) of the preamble and to include a SIG-2 presence indicator to indicate that a second signal field (SIG-2) is not included in the preamble.

10 Claims, 16 Drawing Sheets

(56)     References Cited

U.S. PATENT DOCUMENTS

| 2020/0267636 A1   | 8/2020  | Cavalcanti et al. |              |
|-------------------|---------|-------------------|--------------|
| 2020/0267653 A1*  | 8/2020  | Son               | H04L 27/26   |
| 2021/0045151 A1*  | 2/2021  | Chen              | H04W 74/004  |
| 2022/0095347 A1*  | 3/2022  | Huang             | H04L 5/0055  |
| 2022/0264645 A1*  | 8/2022  | Park              | H04W 74/0816 |
| 2022/0287049 A1*  | 9/2022  | Cavalcanti        | H04W 74/06   |
| 2022/0337343 A1*  | 10/2022 | Noh               | H04L 1/1614  |
| 2024/0259916 A1*  | 8/2024  | Huang             | H04L 5/0044  |
| 2024/0283613 A1*  | 8/2024  | Huang             | H04L 5/0023  |
| 2025/0039892 A1*  | 1/2025  | Son               | H04L 1/00    |
| 2025/0105946 A1*  | 3/2025  | Lou               | H04L 1/0072  |
| 2025/0192967 A1*  | 6/2025  | Park              | H04W 72/04   |
| 2025/0234375 A1*  | 7/2025  | Cherian           | H04W 74/0808 |

FOREIGN PATENT DOCUMENTS

| WO | WO-2019125396 A1 | 6/2019  |
|----|------------------|---------|
| WO | WO-2019236052 A1 | 12/2019 |

* cited by examiner

COMMUNICATION WITHIN SYNCHRONIZED TRANSMISSION OPPORTUNITIES (S-TXOPS) USING SHORT PREAMBLE

RELATED APPLICATION

This application is related to U.S. patent application Ser. No. 17/824,520, Filed May 25, 2022, entitled "ACCESS POINT CONFIGURED FOR SIGNALING CONFIGURATION AND RESOURCE ALLOCATION INSIDE A SYNCHRONIZED TRANSMISSION OPPORTUNITY (S-TXOP)".

TECHNICAL FIELD

Embodiments pertain to wireless communications. Some embodiments relate to wireless networks including wireless local area networks (WLANS) including those operating in accordance with the IEEE 802.11 standards. Some embodiments relate to wireless time-sensitive networks (TSN) and wireless time-sensitive networking (WTSN).

BACKGROUND

Emerging time-sensitive (TS) applications represent new markets for wireless networks. Industrial automation, robotics, AR/VR and HMIs (Human-Machine Interface) are example applications. IEEE TSN (Time-Sensitive Networking) standards are being extended over Wi-Fi and 5G to provide the determinism required by many applications in industrial, enterprise and consumer domains. TSN features over Wi-Fi will need more efficient scheduling capabilities from the 802.11 MAC. Although IEEE 802.11ax has introduced triggered-based OFDMA operation, the overhead involved in the basic trigger-based data exchange within a TXOP is high, especially for small packet sizes. Many time-sensitive applications involve isochronous (cyclic) transmission of small packets (typically a few bytes) within very short cycles with high reliability. Thus what is needed are communication techniques suitable for time-sensitive applications that require lower overhead and are compatible with legacy network communications (i.e., IEEE 802.11ax and previous versions of the 802.11 standard).

DETAILED DESCRIPTION

Figure 1A:
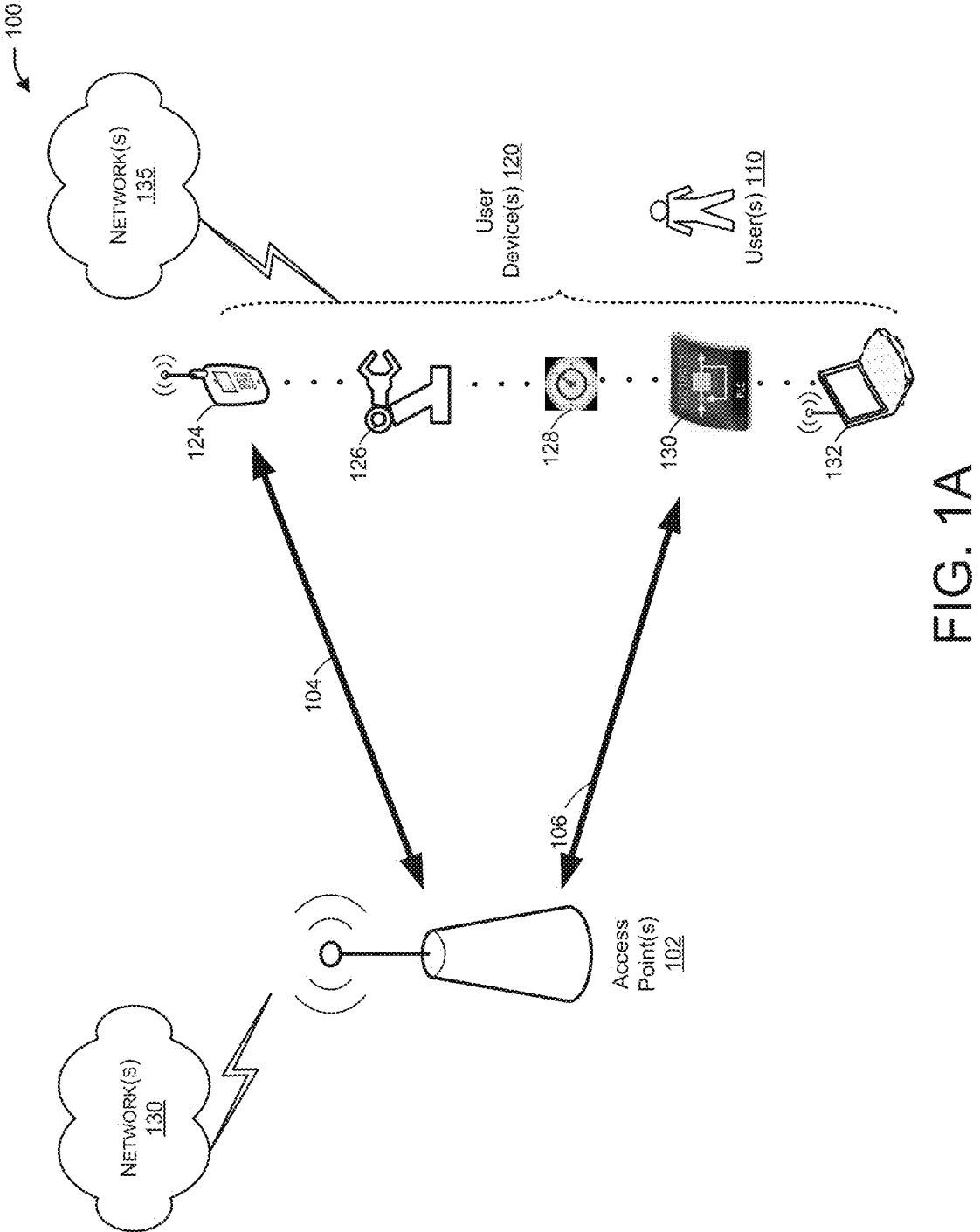
FIG. 1A illustrates an example network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments disclosed herein may utilize an synchronized transmission opportunity (S-TXOP) that allows very low overhead data transmission in WLANs, including TSNs, targeting isochronous traffic with strict latency bounds. The S-TXOP allows PPDU lengths to be reduced by eliminating some legacy parts in a preamble and by compressing signaling for allocating resources. For example, in the UL (e.g., information in Basic TF) or DL direction (e.g., information in EHT-SIG-B), an index to a known allocation may be provided within the PPDU rather than providing the complete resource allocation.

In some embodiments, an access point station (AP) is configured for communicating with a plurality of non-AP stations (STAs) within a synchronized transmission opportunity (S-TXOP). In these embodiments, the S-TXOP may comprise an S-TXOP trigger followed by a plurality of S-TXOP slots. After transmission of the S-TXOP trigger, the AP may encode, for transmission within an S-TXOP slot of the S-TXOP, a downlink (DL) multi-user physical layer protocol data unit (DL MU-PPDU). The DL MU-PPDU may be encoded to include a preamble followed by a data field. In these embodiments, to indicate that a previously signaled resource unit (RU) allocation is to be used during the S-TXOP slot, the AP may encode the preamble to include an allocation ID of the previously signaled RU allocation in a signal field (SIG) of the preamble. In these embodiments, the AP may also encode the preamble to include a SIG-2 presence indicator to indicate that a second signal field (SIG-2) is not included in the preamble of the DL MU-PPDU. In these embodiments, the previously signaled RU allocation is signaled via the S-TXOP trigger. These embodiments, as well as others, are described in more detail below.

Reliable and deterministic communications between devices may be required in some circumstances. One example may be time sensitive networking (TSN). TSN applications may require very low and bounded transmission latency and high availability and may include a mix of traffic patterns and requirements from synchronous data flows (e.g., from sensors to a controller in a closed loop control system), to asynchronous events (e.g., a sensor detecting an anomaly in a monitored process and sending a report right away), to video streaming for remote asset monitoring and background IT/office traffic. Many TSN applications also may require communication between devices with ultra-low latency (e.g., on the order of tens of microseconds).

Autonomous systems, smart factories, professional audio/video, and mobile virtual reality are examples of time sensitive applications that may require low and deterministic latency with high reliability. Deterministic latency/reliability may be difficult to achieve with existing Wi-Fi standards (e.g., the IEEE 802.11 family of standards), which may focus on improving peak user throughput (e.g., the IEEE 802.11ac standard) and efficiency (e.g., the IEEE 802.11ax standard). Extending the application of Wi-Fi beyond consumer-grade applications to provide wireless TSN (WTSN) performance presents an opportunity to apply Wi-Fi to Internet of things (IOT), and new consumer markets (e.g., wireless virtual reality). The non-deterministic nature of the IEEE 802.11 medium access control (MAC) layer in an unlicensed spectrum may impose challenges to expanding the application of Wi-Fi in this manner, especially when trying to guarantee reliability in comparison to Ethernet TSN applications.

It may be desirable to enable time-synchronized and scheduled MAC layer communications to facilitate time sensitive transmissions over Wi-Fi. The MAC may benefit from a more flexible control/management mechanism to adapt scheduling and/or transmission parameters (e.g., adapt a modulation and coding scheme and increase power) to control latency and to increase reliability. For example, changes in a wireless channel, such as interference or fading, may trigger retransmissions, which may impact the latency for time sensitive data due to increased channel throughput. An access point (AP) may update station (STA) transmission parameters to increase reliability (e.g., increase transmission power), which may require a transmission schedule update. An AP may also reduce a number of STAs that share a given service period to provide more capacity for retransmissions within a maximum required latency. Another example may include high-priority data (e.g., random alarms/events in an industrial control system), which may need to be reported with minimal latency, but cannot be scheduled a priori. Although regular beacons may be used to communicate scheduling and other control/management updates, it may be desirable to have a more deterministic and flexible control mechanism in future Wi-Fi networks that may enable faster management/scheduling of a wireless channel to facilitate time sensitive applications with high reliability and efficiency.

It may also be desirable to ensure that devices in a network or extended service set (ESS) receive schedule updates and maintain a synchronized schedule. Once a time sensitive transmission schedule is updated, all devices may need to receive the updated schedule before the schedule may become applicable, otherwise the updated schedule may not be reliable (e.g., not all devices may properly follow the schedule). To meet the requirements of time sensitive traffic, it may be desirable to ensure that all relevant devices comply with schedule updates regardless of active and sleep states of the devices.

To enable synchronization and scheduling, control/management frames may be used. Control/management frames may share a channel with data frames. It may be desirable, however, to have a dedicated channel for control/management frames that may be separate from a data channel. In addition, it may be desirable to have mechanisms to enable dynamic control/management actions using controlled latency and high reliability. Something other than beacon transmissions by themselves may be beneficial to enable dynamic and fast updates to operations required to maintain a quality of service for time sensitive applications.

To support such WTSN operations, it may be beneficial to redesign the MAC layer and physical layer (PHY) to improve efficiency and performance without needing to consider legacy behaviors or support backward compatibility while being able to coexist with legacy devices. A greenfield mode may refer to a device that assumes that there are no legacy (e.g., operating under previous protocol rules) stations (STAs) using the same channel. Thus, a device operating with a greenfield mode may operate under an assumption that all other STAs follow the same (e.g., newest) protocols, and that no legacy STAs are competing for the same channel access. In some embodiments, an STA operating with a greenfield mode may at least assume that any legacy STAs that may exist may be managed to operate in a separate channel and/or time. However, operations with multiple access points (APs) may experience interference, latency, and/or other performance issues. For example, APs may not all be aware of what other APs and STAs may be doing. Therefore, it may be desirable to define a greenfield Wi-Fi operation in a 6-7 GHz band or another frequency band, and thereby enable a time synchronized scheduled access mode for multiple APs in the 6-7 GHz band or other existing frequency bands (e.g., 2.4 GHz, 5 GHz) of future Wi-Fi generations.

The design of a greenfield air interface may be governed by significant reliability and latency constraints imposed by WTSN operations. It may therefore be desirable to efficiently design MAC and PHY communications to support WTSN applications. Legacy MAC/PHY operations may be asynchronous and may apply contention-based channel access and may require significant overhead for backward compatibility that may be important for devices to coexist in unlicensed frequency bands. Such legacy MAC/PHY operations may be too inefficient to support time sensitive applications, especially as such traffic increases, but they may still be used for non-time sensitive data or control traffic (e.g. in a legacy control channel).

While contention-free channel access mechanisms exist (e.g., point coordination function, hybrid coordination function controlled channel access), such mechanisms may lack the predictability required to support WTSN operations, as the mechanisms may be stacked on a distributed coordination function and may use polling operations with significant overhead and other inefficient steps.

Device synchronization may use transmissions with significant overhead. For example, PHY headers may be included in some or all transmissions between devices. For example, data frames and acknowledgement (ACK) frames may use legacy preambles that make the frames longer, reducing the number of transmissions that may be accomplished during a transmission opportunity (TXOP). Synchronization that occurs up front (e.g., at the start of a TXOP) may allow for reduced overhead in subsequent transmissions, and therefore may reduce the resources required for some transmissions and may allow for more throughput and lower latency in a channel.

Example embodiments of the present disclosure relate to systems, methods, and devices for enhanced time sensitive networking for wireless communications. In some embodiments, time sensitive control and data channel operations may be enabled for IEEE 802.11 standards, including for future generations of IEEE 802.11 standards (e.g., beyond IEEE 802.11ax, including 6-7 GHz communication bands, and/or in deployments in which it may be feasible to enable channel/band steering of an STA with time sensitive requirements, such as in managed private networks.

In some embodiments, control information may be updated (e.g., using scheduling) without interfering with time sensitive data, ensuring latency and reliability guarantees. For example, a time sensitive data transmission may be needed, and control information such as transmission schedules may also need to be updated to facilitate subsequent transmission. The control information updates may be sent and implemented without interfering with the time sensitive data transmissions.

In some embodiments, a time sensitive control channel (TSCCH) may be defined by combining two approaches: a periodic approach and an on-demand approach. The period approach may include predefined control slots. In the on-demand approach, an AP may define control slots as needed. A TSCCH access mechanism may use contention-based or time synchronized scheduled access procedures. Also, a wake-up signal may be used to allow delivery of time sensitive control/management information to STAs across a network, reducing latency and allowing power save modes for the STAs.

In some embodiments, a TSCCH may be in a different physical/logical channel from a data transmission. For example, a data transmission may use a data channel (e.g., in a 6-7 GHz band) while TSCCH may use separate control channel in another band (e.g., 2.4 GHz or 5 GHz).

In some embodiments, use of a TSCCH operation and access mechanism may allow improved flexibility and more deterministic opportunities for an AP to provide timely updates (e.g., schedules and control parameters) needed to manage latency and reliability, which may be beneficial in supporting time sensitive applications.

In some embodiments, a greenfield operation deployed in existing or new frequency bands (e.g., 6-7 GHz) and other managed networks may facilitate improved management of Wi-Fi networks operating in scheduled modes with time sensitive operations.

In some embodiments, it may be assumed that a Wi-Fi network may be managed and that there are no unmanaged nearby Wi-Fi STAs or networks. This assumption may be reasonable for time sensitive applications.

In some embodiments, it may be assumed that APs and STAs may synchronize their clocks to a master reference time. For example, STAs may synchronize to beacons and/or may use time synchronization protocols (e.g., as defined by the IEEE 802.1AS standard or other synchronization capabilities defined in the 802.11 standard).

In one or embodiments, it may be assumed that an AP may define a time-synchronized scheduled mode. In some embodiments, a greenfield mode may apply to a 6-7 GHz frequency band, and the greenfield mode may apply to other bands (e.g., 2.4 GHz, 5 GHz) where support for legacy devices may not be required (e.g., in some private networks). A greenfield mode may be applied according to the following principles.

In some embodiments, a fully synchronized and scheduled operation may be defined for a self-contained/synchronized transmission opportunity (S-TXOP) that may include a series of both uplink and downlink transmissions. During an S-TXOP, an AP may maintain control of a medium and may schedule access across predefined deterministic time boundaries. The use of an S-TXOP may maximize an amount of TSN traffic served while providing latency and reliability guarantees that support time sensitive operations with high efficiency.

In some embodiments, communication overheads related to synchronization, channel measurement and feedback, scheduling, and resource allocation may be intelligently packed at the beginning of an S-TXOP and may allow subsequent data transmissions to be extremely lightweight with minimal overhead. For example, up-front synchronization may allow for devices to be configured so that the devices do not need as much information as is currently provided in legacy headers. Instead, headers may be shorter because an S-TXOP has been coordinated among devices. The reduced overhead may allow for more TSN traffic to be served while providing sufficient latency and reliability of transmissions.

In some embodiments, there may be flexibility to define deterministic communication boundaries within an S-TXOP to accommodate applications requiring latency bounds in a sub-millisecond range, or other tight time ranges, for example.

In some embodiments, a multi-band framework may be leveraged to allow backward compatibility and coexistence with legacy Wi-Fi applications. A new greenfield mode as defined herein may be used for data communications, and minimal control may be required to sustain target latency, reliability, and throughput performance. Legacy modes and bands may be used to perform basic/long-term control and management tasks (e.g., non-time sensitive tasks) as well as time sensitive tasks.

In some embodiments, to reduce overhead for coexistence, a first transmission in an S-TXOP may include a legacy preamble to enable coexistence with legacy devices.

In some embodiments, enhanced time sensitive networking may improve performance over some existing wireless communications. For example, efficiency and latency may be improved, and the enhanced time sensitive networking may support a larger number of STAs for a given wireless resource while meeting latency bounds for TSN applications. (e.g., augmented virtual reality, industrial control, and autonomous systems). Enhanced time sensitive networking may allow coexistence with legacy Wi-Fi operations by leveraging multi-band devices. Coexistence across networks operating in a greenfield mode as defined herein may be allowed by having better management and coordination across basic service sets (BSSs), which may be facilitated by higher layer management/coordination protocols.

In some embodiments, a number of assumptions may be used for the greenfield mode of enhanced time sensitive networking. In some embodiments, WTSN STAs may be multi-band devices in which the MAC/PHY may operate in a different band (e.g., 6-7 GHz) than the band of a legacy STA, which may operate in 2.4 GHz or 5 GHz bands.

In some embodiments, a fully managed Wi-Fi deployment scenario in which other radio technology (e.g., legacy Wi-Fi or cellular) may not be expected to operate in a same band where a WTSN STA may be operating. In some embodiments, the enhanced time sensitive networking may be used in an indoor operating environment with relatively low mobility.

In some embodiments, a packet belonging to a TSN-grade application when queued at a WTSN STA may be dropped at a transmitter side if the packet does not get into air within a certain latency bound time.

The above descriptions are for purposes of illustration and are not meant to be limiting. Numerous other examples, configurations, processes, etc., may exist, some of which are described in detail below. Example embodiments will now be described with reference to the accompanying figures.

FIG. 1A is a diagram illustrating an example network environment, in accordance with some embodiments. Wireless network 100 may include one or more user devices 120 and one or more access point(s) (APs) 102, which may communicate in accordance with and compliant with various communication standards and protocols, such as, Wi-Fi, TSN, Wireless USB, P2P, Bluetooth, NFC, or any other communication standard. The user device(s) 120 may be mobile devices that are non-stationary (e.g., not having fixed locations) or may be stationary devices.

Figure 6:
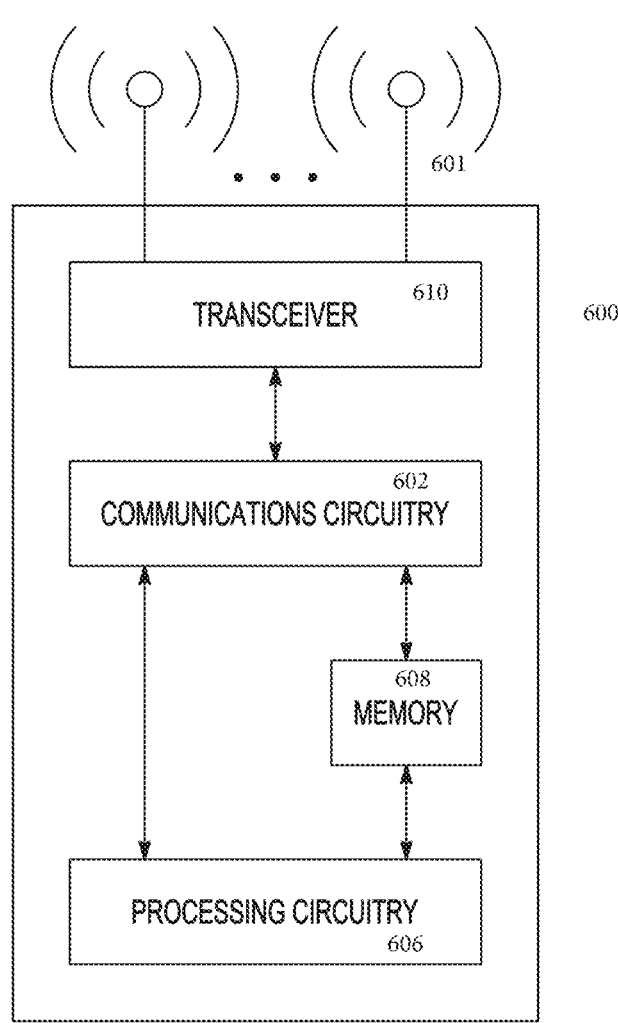
FIG. 6 illustrates a wireless communication device, in accordance with some embodiments.

In some embodiments, the user devices 120 and AP 102 may include one or more computer systems similar to that of the functional diagram of FIG. 6. One or more illustrative user device(s) 120 and/or AP 102 may be operable by one or more user(s) 108. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP 102 may operate as a personal basic service set (PBSS) control point/access point (PCP/AP). The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a robotic device, an actuator, a robotic arm, an industrial robotic device, a programmable logic controller (PLC), a safety controller and monitoring device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Any of the user device(s) 120 (e.g., user devices 124, 126, 128, 130, and 132), and AP 102 may be configured to communicate with each other via one or more communications networks 135 and/or 140 wirelessly or wired. The user device(s) 120 may also communicate peer-to-peer or directly with each other with or without the AP 102. Any of the communications networks 135 and/or 140 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 135 and/or 140 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 135 and/or 140 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128, 130, and 132) and AP 102 may include one or more communications antennas. The one or more communications antennas may be any suitable type of antennas corresponding to the communications protocols used by the user device(s) 120 (e.g., user devices 124, 126, 128, 130, and 132), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128, 130, and 132), and AP 102 may be configured to perform directional transmission and/or directional reception in conjunction with wirelessly communicating in a wireless network. Any of the user device(s) 120 (e.g., user devices 124, 126, 128, 130, and 132), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128, 130, and 132), and AP 102 may be configured to perform any given directional transmission towards one or more defined transmit sectors. Any of the user device(s) 120 (e.g., user devices 124, 126, 128, 130, and 132), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128, 130, and 132), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more communication standards and protocols, such as, Wi-Fi, TSN, Wireless USB, Wi-Fi P2P, Bluetooth, NFC, or any other communication standard. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP 102) establishes communication with one or more user devices 120 (e.g., user devices 124, 126, 128, 130 and/or 132), the AP 102 may communicate in a downlink direction and the user devices 120 may communicate with the AP 102 in an uplink direction by sending frames in either direction. The user devices 120 may also communicate peer-to-peer or directly with each other with or without the AP 102. The data frames may be preceded by one or more preambles that may be part of one or more headers. These preambles may be used to allow a device (e.g., AP 102 and/or user devices 120) to detect a new incoming data frame from another device. A preamble may be a signal used in network communications to synchronize transmission timing between two or more devices (e.g., between the APs and user devices).

In some embodiments, and with reference to FIG. 1A, an AP 102 may communicate with user devices 120. The user devices 120 may include one or more wireless devices (e.g., user devices 124, 132) and one or more wireless TSN devices (e.g., user devices 126 128, 130). The user devices may access a channel in accordance with medium access control (MAC) protocol rules or any other access rules (e.g., Wi-Fi, Bluetooth, NFC, etc.). It should be noted that reserving a dedicated TSN channel and controlling access to it may also be applicable to cellular systems/3GPP networks, such as LTE, 5G, or any other wireless networks. The wireless TSN devices may also access a channel according to the same or modified protocol rules. However, the AP 102 may dedicate certain channels or sub-channels for TSN applications that may be needed by the one or more wireless TSN devices (e.g., user devices 126, 128, and 130), and may allocate other channels or sub-channels for the non-TSN devices (e.g., user devices 124 and 132).

In some embodiments, AP 102 may also define one or more access rules associated with the dedicated channels. A channel may be dedicated for TSN transmissions, TSN applications, and TSN devices. For example, user device 126 may access a dedicated TSN channel for TSN transmissions. TSN transmissions may include transmissions that have very low transmission latency and high availability requirements. Further, the TSN transmissions may include synchronous TSN data flows between sensors, actuators, controllers, robots, in a closed loop control system. The TSN transmissions require reliable and deterministic communications. A channel may be accessed by the user device 126 for a number of TSN message flows and is not limited to only one TSN message flow. The TSN message flows may depend on the type of application messages that are being transmitted between the AP 102 and the user device 126.

In some embodiments, while frequency planning and channel management may be used to allow AP 102 to collaborate with neighboring APs (not shown) to operate in different channels, the efficiency and feasibility of reserving multiple non-overlapping data channels for time sensitive applications may be improved. It may be desirable to limit the amount of resources reserved for time sensitive data through efficient channel reuse. If multiple devices (e.g., user devices 124, 126, 128, 130, 132) share a dedicated channel for time sensitive data transmissions, interference among multiple transmissions may be reduced with enhanced coordination between the devices and one or more APs (e.g., AP 102). For example, overlap and interference of control transmissions (e.g., a beacon), downlink data transmissions, and uplink data transmissions may be reduced with enhanced coordination. Such enhanced coordination for multiple APs may enable more efficient channel usage while also meeting latency and reliability requirements of time sensitive applications. For example, if control transmissions are not received and interpreted properly, time sensitive operations may not be scheduled properly, and/or may interfere with other transmissions, possibly causing operational errors.

In some embodiments, AP 102 may include WTSN controller functionality (e.g., a wireless TSN controller capability), which may facilitate enhanced coordination among multiple devices (e.g., user devices 124, 126, 128, 130, 132). AP 102 may be responsible for configuring and scheduling time sensitive control and data operations across the devices. A wireless TSN (WTSN) management protocol may be used to facilitate enhanced coordination between the devices, which may be referred to as WTSN management clients in such context. AP 102 may enable device admission control (e.g., control over admitting devices to a WTSN), joint scheduling, network measurements, and other operations.

In some embodiments, AP 102's use of WTSN controller functionality may facilitate AP synchronization and alignment for control and data transmissions to ensure latency with high reliability for time sensitive applications on a shared time sensitive data channel, while enabling coexistence with non-time sensitive traffic in the same network.

In some embodiments, AP 102 and its WTSN coordination may be adopted in future Wi-Fi standards for new bands (e.g., 6-7 GHz), in which additional requirements of time synchronization and scheduled operations may be used. Such application of the WTSN controller functionality may be used in managed Wi-Fi deployments (e.g., enterprise, industrial, managed home networks, etc.) in which time sensitive traffic may be steered to a dedicated channel in existing bands as well as new bands.

In some embodiments, it may be assumed that a Wi-Fi network may be managed, and that there are no unmanaged Wi-Fi STAs/networks nearby.

In some embodiments, it may be assumed that APs and STAs may synchronize their clocks to a master reference times (e.g., STAs may synchronize to beacons and/or may use time synchronization protocols as defined in the IEEE 802.1AS standard).

In some embodiments, it may be assumed that APs and STAs may operate according to a time synchronized scheduled mode that may also apply to new frequency bands (e.g., 6-7 GHz), for which new access protocols and requirements also may be proposed.

In some embodiments, a WTSN domain may be defined as a set of APs (e.g., AP 102) and STAs (e.g., user devices 124, 126, 128, 130, and 132) that may share dedicated wireless resources, and therefore may need to operate in close coordination, at a level of control and time sensitive data scheduling, to ensure latency and reliability guarantees. Different APs in the same network may form different WTSN domains.

In some embodiments, the WTSN management protocol may be executed over a wired (e.g., Ethernet) TSN infrastructure that may provide TSN grade time synchronization accuracy and latency guarantees. The WTSN management protocol may also be executed using wireless links (e.g., a wireless backhaul, which may include Wi-Fi or WiGig links through one or multiple hops). An Ethernet TSN interface may be replaced by a wireless interface (e.g., and 802.11 MAC and/or physical layer PHY). An operation of a second wireless interface may also be managed by AP 102 to avoid interference with an interface used for communication with time sensitive user STAs (e.g., user devices 126, 128, and 130).

In some embodiments, AP 102 may perform admission control and scheduling tasks. To complete an association procedure for an STA with time sensitive data streams (e.g., user device 130), the STA may request admission from AP 102. AP 102 may define which APs may be in a WTSN domain and may determine the admission of new time sensitive data streams based on, for example, available resources and user requirements. AP 102 may create and/or update a transmission schedule that may include time sensitive operations and/or non-time sensitive operations, and the schedule may be provided to admitted user devices. AP 102 may be responsible for executing the schedule according to time sensitive protocols defined, for example, at 802.11 MAC/PHY layers.

In some embodiments, AP 102 may perform transmission schedule updates. AP 102 may update a transmission schedule for time sensitive data and may send transmission schedule updates to STAs and/or other APs during network operation. A transmission schedule update may be triggered by changes in wireless channel conditions at different APs and/or STAs within a common WTSN domain. The condition changes may include increased interference, new user traffic requests, and other network and/or operational changes that may affect a WTSN domain.

In some embodiments, AP 102 may collect measurement data from other devices in a WTSN domain. The measurement data may be collected from time sensitive and/or non-time sensitive devices. AP 102 may maintain detailed network statistics, for example, related to latency, packet error rates, retransmissions, channel access delay, etc. The network statistics may be collected via measurement reports sent from STAs. AP 102 may use network statistics to proactively manage wireless channel usage to allow for a target latency requirement to be satisfied. For example, measurements may be used to determine potential channel congestion and to trigger a change from a joint transmission schedule mode to a mode in which APs may allocate a same slot to multiple non-interfering STAs that may be leveraging spatial reuse capabilities.

It is understood that the above descriptions are for purposes of illustration and are not meant to be limiting.

Figure 1B:
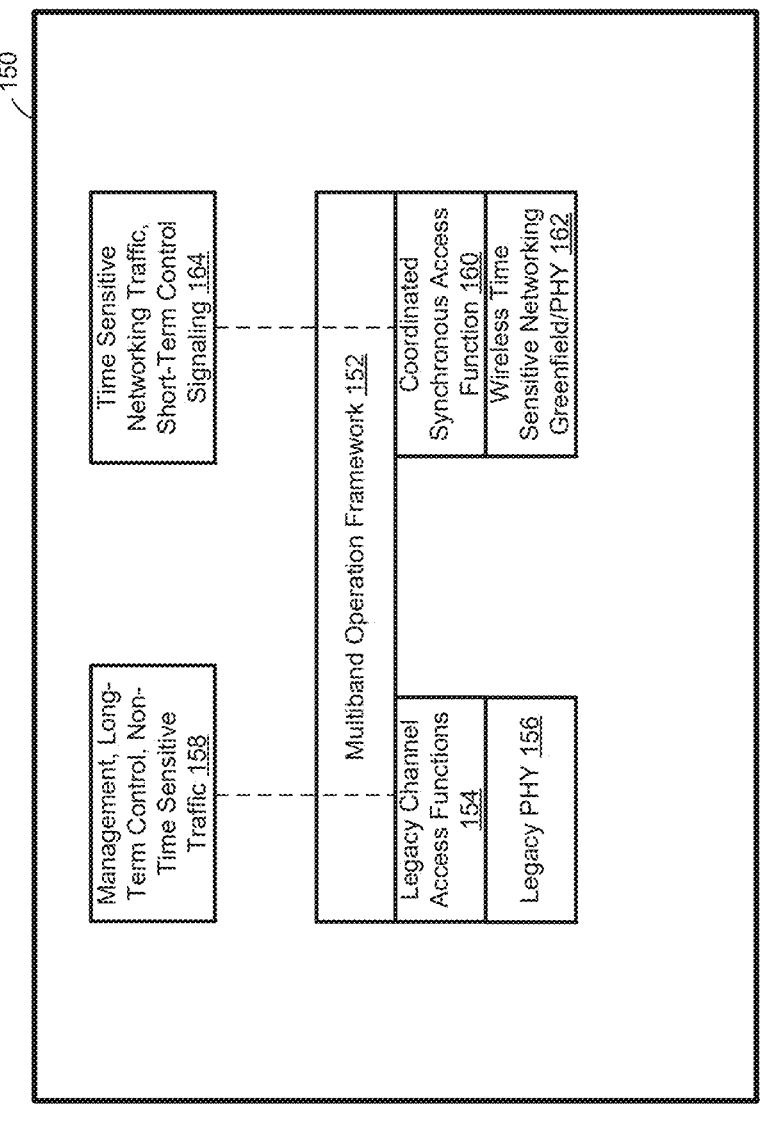
FIG. 1B illustrates an enhanced wireless time sensitive networking (WTSN) medium access control/physical layer (MAC/PHY) configuration for a WTSN device, in accordance with some embodiments.

FIG. 1B illustrates an enhanced WTSN MAC/PHY configuration for a WTSN device 150, in accordance with some embodiments.

In some embodiments, the WTSN device 150 may include a multiband operation framework 152, legacy channel access functions 154, legacy PHY 156, management, long-term control, and non-time sensitive traffic 158, coordinated synchronous access function (CSAF) 160, WTSN greenfield/PHY 162, and TSN traffic, short-term control signaling 164.

In some embodiments, the multiband operation framework 152 may allow WTSN device 150 to perform multiband operations. For example, some operations may be performed in one frequency band, while other operations may be performed in another frequency band. One frequency band may include a control channel, and another frequency band may include separate data channels.

In some embodiments, to provide for both WTSN and non-TSN operations, the WTSN device 150 may include a link for management, long-term control, and non-time sensitive traffic 158, and a link for TSN traffic and short-term control signaling 164. To support the management, long-term control, and non-time sensitive traffic 158, WTSN device 150 may include legacy channel access functions 154. Legacy channel access functions 154 may include a distributed coordination function (DCF), hybrid coordination function controlled channel access (HCF), and other channel access functions. The management, long-term control, and non-time sensitive traffic 158 may also be supported by a legacy PHY 156 (e.g., on a 2.4 GHz or 5 GHz frequency). Long-term control may include beacon transmissions, network association, security procedures, and other control traffic. Short-term control may include radio synchronization (e.g., time-frequency synchronization), scheduling, channel feedback, and other control traffic.

In some embodiments, to support the TSN traffic, short-term control signaling 164, WTSN device 150 include the CSAF 160 and the WTSN greenfield/PHY 162. The CSAF 160 may use a central coordinator at WTSN device 150 (e.g., AP 102 of FIG. 1A) to maintain a MAC/PHY level synchronization between the WTSN device 150 and non-AP STAs during an S-TXOP. The WTSN device 150 may control access to wireless media in a scheduled fashion in time, frequency, and spatial dimensions. With an infrastructure for a basic service set (BSS) for WTSN, during an S-TXOP, all WTSN STAs may need to adhere to the MAC/PHY synchronization at all times.

In some embodiments, when WTSN STAs (e.g., user device 126, user device 128, user device 130 of FIG. 1A) are not standalone devices, WTSN-capable devices may associate with a network using a legacy link (e.g., legacy channel access functions 154, legacy PHY 156, and management, long-term control, non-time sensitive traffic 158 of FIG. 1B). During association, a WTSN STA may indicate its capability and interest to join a WTSN operation mode. Through the legacy link, a multiband AP (e.g., AP 102 of FIG. 1A) may instruct the WTSN-capable STA to configure the WTSN STA's MAC/PHY on designated band. The WTSN MAC in the WTSN STA may achieve MAC/PHY synchronization and successfully read initial control and synchronization information in a synchronization and configuration frame (SCF) received from the AP in a WTSN band. Through the legacy link, the AP and STA may complete the association process by exchanging management frames. This process may be referred to as associating or establishing a channel/connection with a device.

In some embodiments, some long-term parameters and control signals related to a WTSN MAC/PHY operation may be conveyed from a WTSN AP to WTSN non-AP STAs through the legacy link.

In some embodiments, the legacy link may also be used for admission control and/or inter-BSS coordination, and the multiband operation framework 152 may be used to direct TSN traffic (e.g., TSN traffic, short-term control signaling 164) to the WTSN MAC/PHY (e.g., WTSN Greenfield/PHY 162). The WTSN MAC/PHY may provide functionality to support ultra-low and near-deterministic packet latency (e.g., one millisecond or less) with virtually no jitter in a controlled environment. Latency may be measured from a time when a logical link control (LLC) MAC service data unit (MDSU) enters a MAC sublayer at a transmitter to a time when the MDSU is successfully delivered from the MAC sublayer to an LLC sublayer on a receiver.

In some embodiments, WTSN operations may be facilitated by a synchronous and coordinated MAC/PHY operation during an S-TXOP between a WTSN AP and one or more non-AP WTSN STAs in a BSS infrastructure.

It is understood that the above descriptions are for purposes of illustration and are not meant to be limiting.

Figure 2:
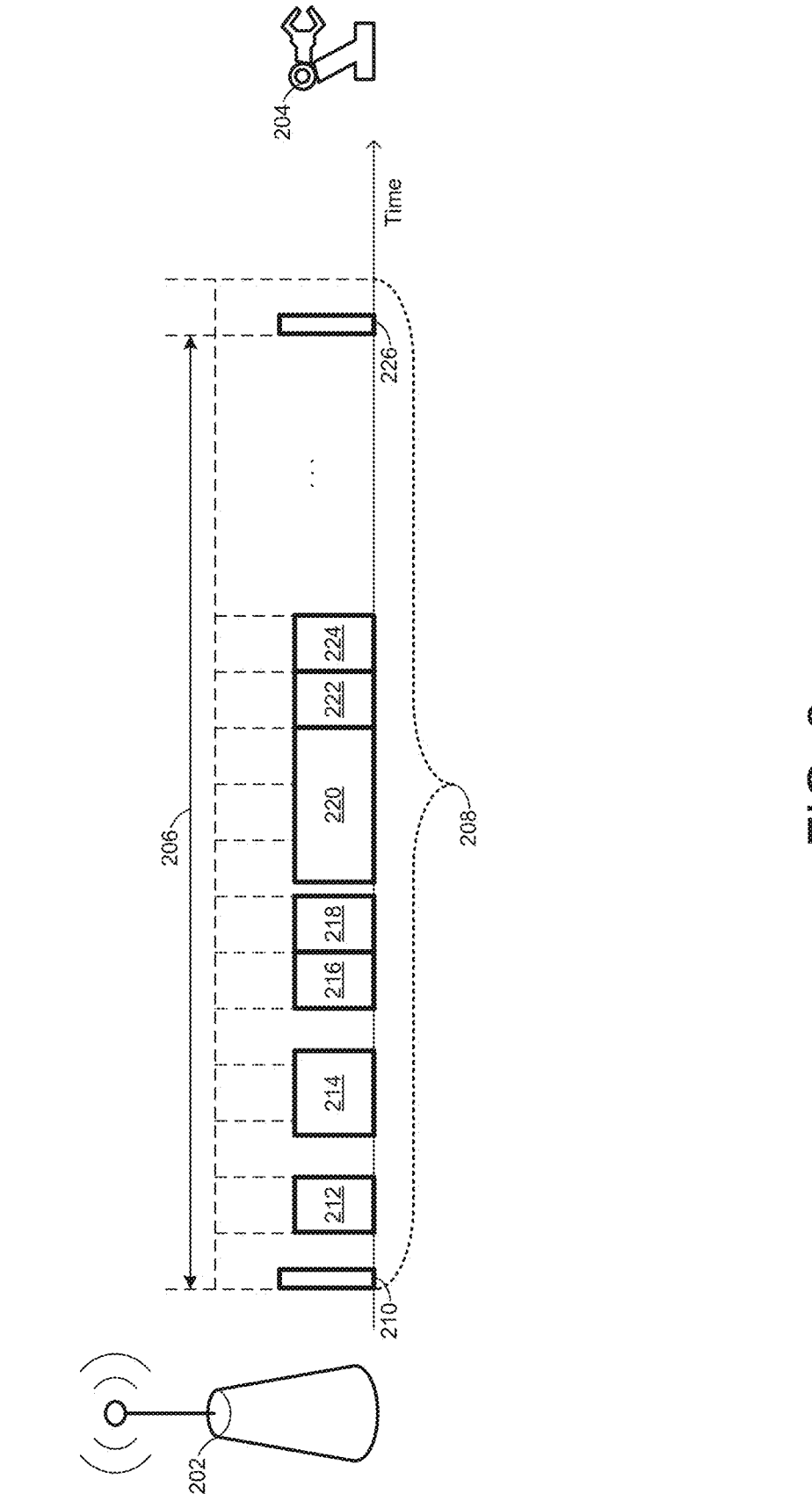
FIG. 2 illustrates a timing diagram of an enhanced WTSN time synchronization, in accordance with some embodiments.

FIG. 2 illustrates an timing diagram 200 of an enhanced WTSN time synchronization, in accordance with some embodiments. Referring to FIG. 2, there is shown uplink and downlink data frame flows between AP 202 and a TSN device 204. For example, TSN device 204 may receive downlink data frames from AP 202 and may send uplink data frames to AP 202. In one embodiment, the WTSN time synchronization may be utilized for persistent scheduling for synchronous transmission from TSN device 204 to AP 202.

In some embodiments, during a beacon period 206 (e.g., 100× cycle time), AP 202 may transmit or receive during one or more service periods 208 that comprise the beacon period 206. For example, service periods 208 may span 1 millisecond or some other time during which one or more transmissions may be made. A cycle time is a parameter that may be configured based on a service and/or latency requirements of one or more applications. For example, an STA application may generate packets in a synchronous/periodic pattern (e.g., of 1 millisecond cycles), and packets generated at the beginning of a cycle may need to be delivered within the cycle.

In some embodiments, AP 202 may send a control frame, such as a beacon 210 during a service period 208 at the beginning of beacon period 206. During TXOP 212, TXOP 214, TXOP 216, TXOP 218, TXOP 220, TXOP 220, TXOP 222, and TXOP 224, AP 202 may send or receive frames to/from TSN device 204. At the conclusion of beacon period 206, a new beacon period may begin with AP 202 sending beacon 226. In some embodiments, the control frame may be a trigger frame. In these embodiments, the control frame may be used to initiate a sequence of multiple transmissions within a period that repeats, as further described herein.

In some embodiments, any of TXOP 212, TXOP 214, TXOP 216, TXOP 218, TXOP 220, TXOP 220, TXOP 222, and TXOP 224 may include restricted or unrestricted service periods, time sensitive service periods, or non-time sensitive service periods. TXOP 212, TXOP 214, TXOP 216, TXOP 218, TXOP 220, TXOP 220, TXOP 222, and TXOP 224 may comprise one or more service periods 208.

It is understood that the above descriptions are for purposes of illustration and are not meant to be limiting.

Figure 3A:
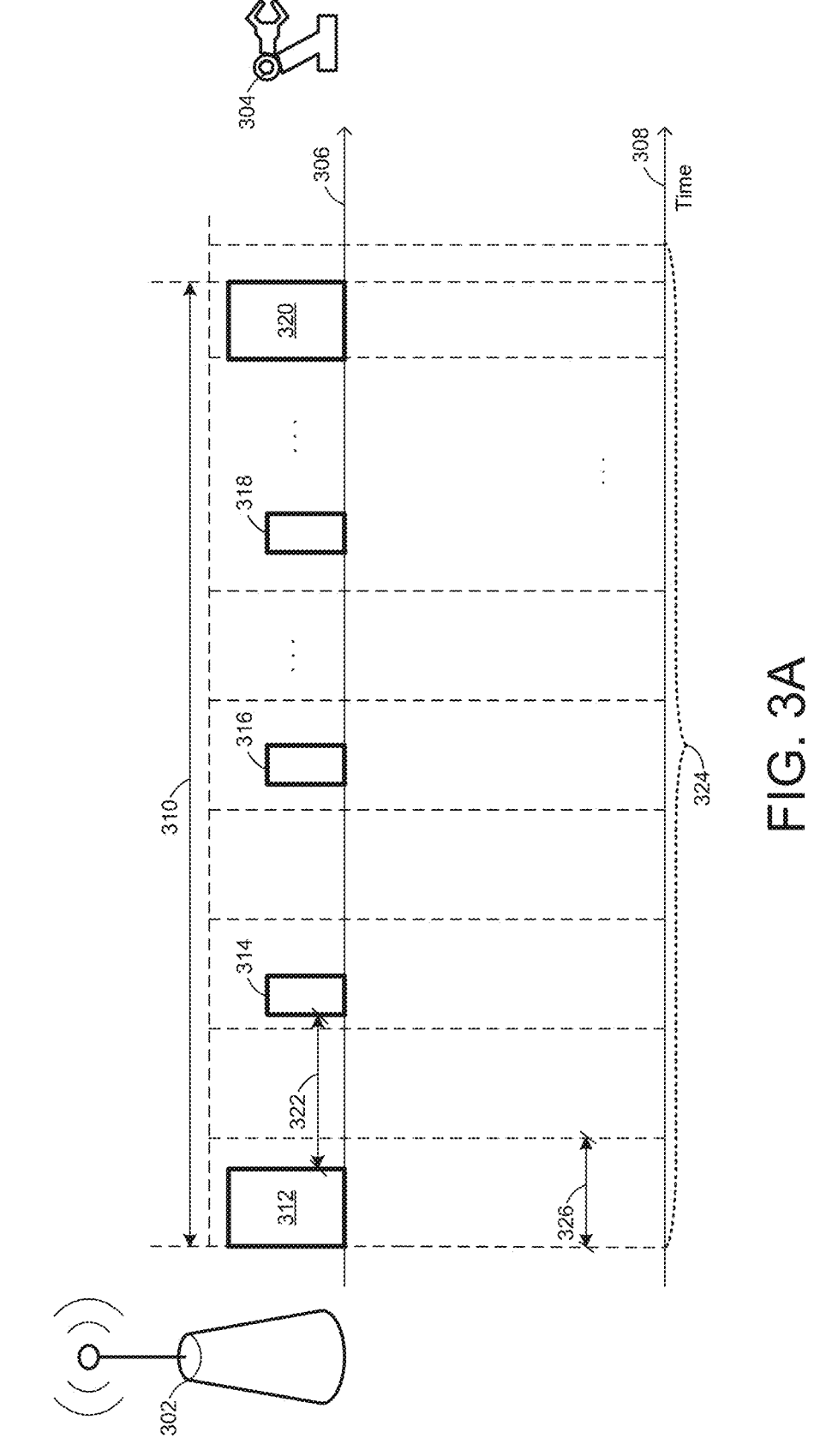
FIG. 3A illustrates a control channel access sequence, in accordance with some embodiments.

FIG. 3A illustrates an control channel access sequence 300, in accordance with some embodiments. In some embodiments, AP 302 may be a WTSN device (e.g., WTSN device 150 of FIG. 1B) in communication with STA 304, which may be another WTSN device. AP 302 and STA 304 may use a TSCCH 306 and a TSDCH 308 to transmit both control/management frames and data frames.

In some embodiments, a beacon period 310 (e.g., 100× cycle time) may begin with AP 302 sending beacon 312. Later in beacon period 310, AP 302 may send short beacon 314, short beacon 316, short beacon 318, or any number of short beacons supported by the beacon period 310. At the end of beacon period 310, another beacon 320 may be sent by AP 302. Beacon 312, short beacon 314, short beacon 316, short beacon 318, and/or beacon 320 may provide control/management frames to STA 304 in TSCCH 306.

In some embodiments, TSCCH 306 and TSDCH 308 may be divided into cycles 324 which may span a cycle time 326 (e.g., 1 ms). Beacon 312, short beacon 314, short beacon 316, short beacon 318, and/or beacon 320 may not require an entire cycle 324.

In some embodiments, TSCCH 306 and TSDCH 308 may be logical channels defined within an existing or new physical channel/frequency band. TSCCH 306 may be defined within a primary channel, while TSDCH 308 may be defined in a secondary or dedicated TS channel, possibly in another frequency band. TSCCH 306 may be used for time sensitive access under control of AP 302. TSDCH 308 may be defined in an existing or new band (e.g., 6-7 GHz).

In some embodiments, configurations for TSCCH 306 and/or TSDCH 308 may be transmitted as information elements in beacon 312, short beacon 314, short beacon 316, short beacon 318, and/or beacon 320. The configurations may provide information identifying the corresponding physical channels used for TSCCH 306 and TSDCH 308.

In some embodiments, TSCCH 306 may be defined as periodic resources (e.g., time-frequency slots) for exchanging control frames. Defining a periodic interval for control frames may be important to enable time sensitive STAs (e.g., STA 304) to schedule time sensitive data and control actions without conflicts (e.g., conflicts with other devices).

In some embodiments, TSCCH 306 may be used to transmit regular beacons (e.g., beacon 312, beacon 320) and short beacons (e.g., short beacon 314, short beacon 316, short beacon 318), which may include a subset of information transmitted of regular beacons (e.g., an updated transmission schedule or bitmap of restricted time sensitive service periods). Short beacon transmissions may be scheduled in predefined intervals (e.g., fractions of beacon period 310). Other management frames may also be transmitted in TSCCH 306, such as association request/response frames, timing measurements, and channel feedback measurement frames.

In some embodiments, access to TSCCH 306 may use contention-based TSN sequence 300. Contention-based TSN sequence 300 may follow a legacy carrier-sense multiple access (CSMA)-based IEEE 802.11 MAC protocol. For example, when TSCCH 306 is defined as the operating/primary channel, AP 302 may contend for TSCCH 306 using enhanced distributed channel access (EDCA) to transmit beacon (e.g., beacon 312, beacon 320) and short beacons (e.g., short beacon 314, short beacon 316, short beacon 318) at predefined intervals. TSCCH control frames (e.g., beacon 312, short beacon 314, short beacon 316, short beacon 318, and/or beacon 320) may include information to support a time synchronized scheduled access in TSDCH 308. Such operation may enable time sensitive operations for legacy Wi-Fi systems in which TSCCH 306 may provide an anchor for TSDCH 308 (e.g., time synchronized and schedule) in one or more restricted channels and/or frequency bands.

In some embodiments, access to TSCCH 306 may use a time-synchronized access method. TSCCH 306 may be defined as periodic scheduled resources (e.g., time slots) for regular beacons (e.g., beacon 312, beacon 320) and short beacons (e.g., short beacon 314, short beacon 316, short beacon 318) using time-synchronized access. Access to time slots (e.g., cycles 324) may still be based on contention (e.g., CSMA) or may be scheduled. For example, slots may be reserved for beacons and short beacons, which may be transmitted periodically (e.g., every fifth slot). TSCCH 306 may also be aligned with TSDCH 308 timing. TSCCH time slots reserved for beacons and/or short beacons may be announced in regular beacons so that newly admitted STAs (e.g., STA 304) may discover TSCCH 306 parameters. All STAs may be required to adhere to time synchronization across channels and ensure TXOPs do not overlap with scheduled TSCCH slots. In addition, all STAs may be required to listen to TSCCH 306 during scheduled beacon/short beacon slots to make sure the STAs receive those beacons/short beacons. Such operation may provide a more deterministic operation as timing of each TSCCH 306 may be controlled and collisions may be avoided through efficient scheduling.

In some embodiments, remaining time of TSCCH slots (e.g., cycles 324) occupied by a beacon/short beacon may be used to exchange other control/management frames. In some embodiments, AP 302 may transmit unicast control/management frames to STA 304 using TSDCH 308 provided that the control/management frames do not interfere with time sensitive data.

It is understood that the aforementioned example is for purposes of illustration and not meant to be limiting.

Figure 3B:
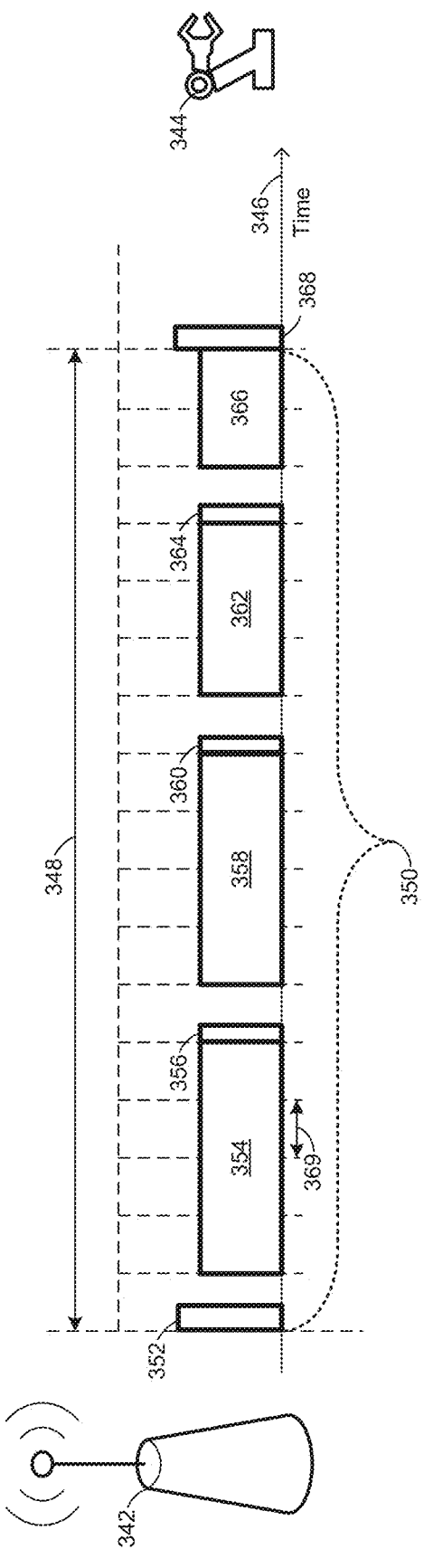
FIG. 3B illustrates a combined channel access sequence, in accordance with some embodiments.

FIG. 3B illustrates an combined channel access sequence 340, in accordance with some embodiments. In some embodiments, AP 342 may be a WTSN device (e.g., WTSN device 150 of FIG. 1B) in communication with STA 344, which may be another WTSN device. AP 342 and STA 344 may use channel 346 to transmit both control/management frames and data frames.

In some embodiments, a beacon period 348 (e.g., 100× cycle time) having one or more cycles 350 may begin with AP 342 sending beacon 352. Later in beacon period 348, AP 342 and/or STA 344 may send one or more data frames 354. AP 342 may send short beacon 356. AP 342 and/or STA 344 may send one or more data frames 358. AP 342 may send short beacon 360. AP 342 and/or STA 344 may send one or more data frames 362. AP 342 may send short beacon 364.

AP 342 and/or STA 344 may send one or more data frames 366. After beacon period 348 has concluded, AP 342 may send another beacon 368 to begin another beacon period. The beacons (e.g., beacon 352, short beacon 356, short beacon 360, short beacon 364, and beacon 368) may be sent in channel 346. The one or more data frames (e.g., one or more data frames 354, one or more data frames 358, one or more data frames 362, and one or more data frames 366) may be sent in the channel 346.

In some embodiments, channel 346 may be divided into cycles 350 which may span a cycle time 369 (e.g., 1 ms). Beacon 352, short beacon 356, short beacon 360, short beacon 364, and beacon 368 may not require an entire cycle 350. The one or more data frames (e.g., one or more data frames 354, one or more data frames 358, one or more data frames 362, and one or more data frames 366) may use one or more cycles 350 and may use partial cycles 350.

In some embodiments, channel 346 may be a physical channel that includes a TSCCH and TSDCH. Using cycles 350, control/management frames (e.g., beacon 352, short beacon 356, short beacon 360, short beacon 364, and beacon 368) and data frames (e.g., one or more data frames 354, one or more data frames 358, one or more data frames 362, and one or more data frames 366) may be scheduled to avoid overlapping/conflicting transmissions. Such enhanced coordination may facilitate WTSN communications which meet the latency and reliability requirements of WTSN operations.

It is understood that the aforementioned example is for purposes of illustration and not meant to be limiting.

Figure 3C:
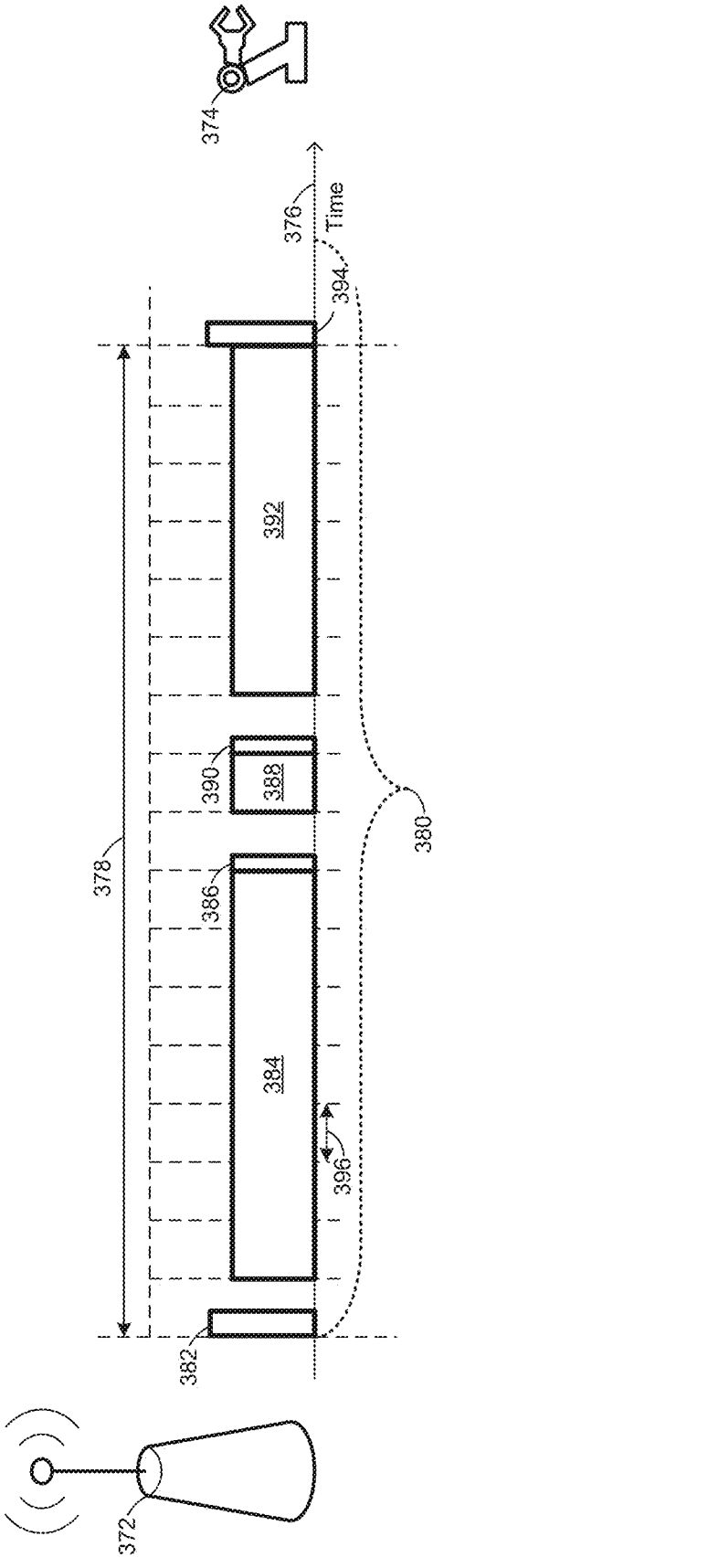
FIG. 3C illustrates an on-demand channel access sequence, in accordance with some embodiments.

FIG. 3C illustrates an on-demand channel access sequence 370, in accordance with some embodiments. In some embodiments, AP 372 may be a WTSN device (e.g., WTSN device 150 of FIG. 1B) in communication with STA 374, which may be another WTSN device. AP 372 and STA 374 may use channel 376 to transmit both control/management frames and data frames.

In some embodiments, a beacon period 378 (e.g., 100× cycle time) having one or more cycles 380 may begin with AP 372 sending beacon 382. Later in beacon period 378, AP 372 and/or STA 374 may send one or more data frames 384. AP 372 may send short beacon 386. AP 372 and/or STA 374 may send one or more data frames 388. AP 372 may send short beacon 390. AP 372 and/or STA 374 may send one or more data frames 392. After beacon period 378 has concluded, AP 372 may send another beacon 394 to begin another beacon period. The beacons (e.g., beacon 382, short beacon 386, short beacon 390, and beacon 394) may be sent in channel 376. The one or more data frames (e.g., one or more data frames 384, one or more data frames 388, and one or more data frames 392) may be sent in the channel 376.

In some embodiments, AP 372 may send control/management frames (e.g., beacon 382, short beacon 386, short beacon 390, and beacon 394) on demand using resources such as time slots (e.g., cycles 380) that may not be reserved for time sensitive data.

It is understood that the aforementioned example is for purposes of illustration and not meant to be limiting.

Emerging time-sensitive (TS) applications represent new markets for Wi-Fi. Industrial automation, robotics, augmented reality (AR)/virtual reality (VR) and HMIs (Human-Machine Interface) are example applications. IEEE TSN (Time-Sensitive Networking) standards are being extended over Wi-Fi and 5G to provide the determinism required by many applications in industrial, enterprise and consumer domains. TSN features over Wi-Fi will need more efficient scheduling capabilities from the 802.11 MAC. Although 802.11ax has introduced new triggered-based OFDMA operation, the overhead involved in the basic trigger-based data exchange within a TXOP is high, especially for small packet sizes. Many time-sensitive applications involve isochronous (cyclic) transmission of small packets (typically a few bytes) within very short cycles with high reliability. Embodiments disclosed herein utilize a Synchronized Transmission Opportunity (S-TXOP).

Example embodiments of the present disclosure relate to systems, methods, and devices for a Mechanism to Signal Configuration and Resource Allocation inside a S-TXOP. This disclosure describes resource allocation and configuration signaling enhancements for the S-TXOP including:

A mechanism to signal S-TXOP configuration options in a beacon or other management frames and associate S-TXOP with restricted TWT service periods.

A STA info list field including scheduling information for STAs within each S-TXOP slot.

Signaling to indicate/enable or disable semi-static scheduling configuration within a S-TXOP.

DL-SIG field for DL slots within a S-TXOP.

UL slot control signaling and configuration options.

The proposed enhancements will enable a more efficient configuration and management of network resources within the S-TXOP with better performance (e.g. lower latency and higher efficiency) and protection from interference from other STAs.

Figure 4A:
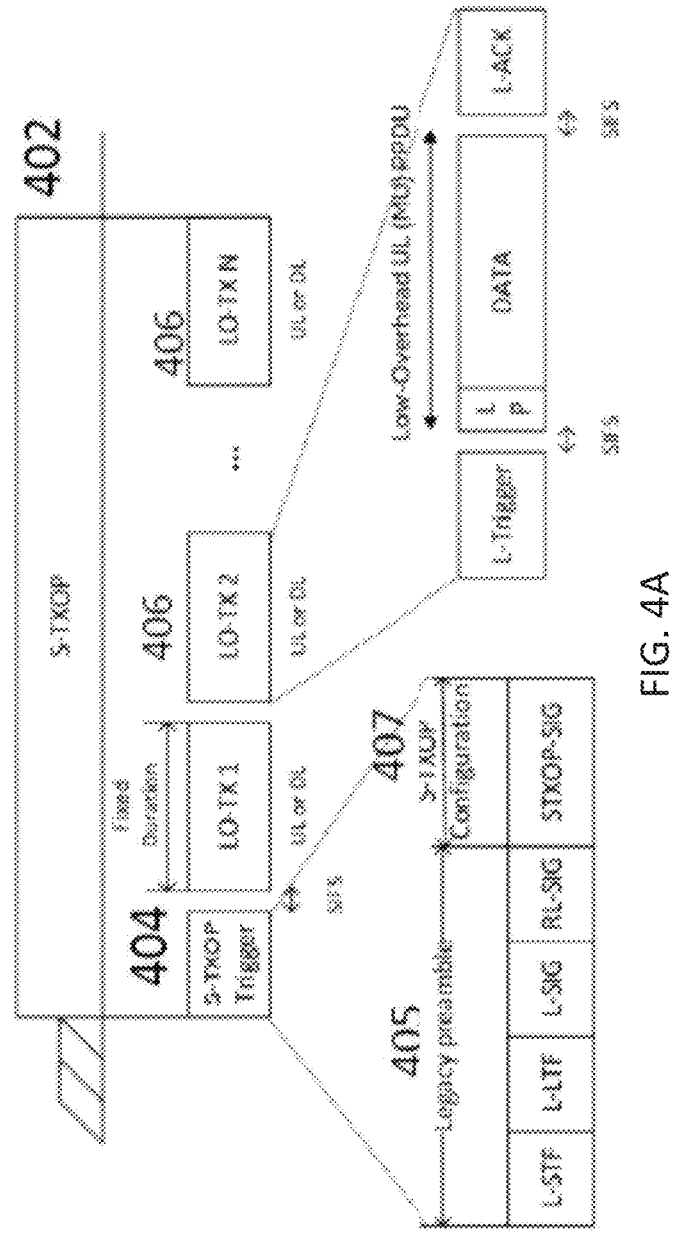
FIG. 4A illustrates a synchronous transmission opportunity (S-TXOP), in accordance with some embodiments.

FIG. 4A illustrates an synchronous transmission opportunity (S-TXOP) 402, in accordance with some embodiments. FIG. 4A describes the detailed frame formats for enabling an S-TXOP 402 in a compatible way with legacy Wi-Fi (802.11ax). The specific signaling options to communicate S-TXOP configurations and detailed resource allocation between AP and STAs are described in more detail herein.

As shown in FIG. 4A, S-TXOP 402 may include an S-TXOP trigger 404 for transmission at a beginning of the S-TXOP 402 followed by a plurality of slots 406. The S-TXOP trigger 404 may include a legacy preamble 405 and optionally a S-TXOP configuration field 407. The S-TXOP configuration field 407 may include a number of slots and a duration. In these embodiments, to reduce overhead for coexistence, a first transmission in the S-TXOP 402 may comprise a legacy preamble 405 for enabling coexistence with legacy devices.

S-TXOP Synchronization: STAs may use the S-TXOP trigger 404 (S-TXOP trigger frame (TF)) to synchronize to the AP for the whole S-TXOP time and only a minimum synchronization/AGC correction may be provided in each low overhead PPDU.

Configuration Signalling: Configuration information and resource allocation for the N transmissions opportunities within the S-TXOP.

Lite Trigger (L-Trigger): A low overhead trigger frame to provide/update resource allocations. It includes only the Light Preamble and a field for UL resource allocations.

Lite Preamble: Small Preamble (one OFDM Symbol) carried by a Low Overhead PPDU to enable STAs to correct small timing/frequency jitter that may occur between DL/UL transitions with the S-TXOP. It does not carry the legacy preamble (L-STF, L-LTF, L-SIG, RL-SIG).

Lite-ACK: A low overhead ACK including only the lite preamble and an ARQ bitmap. Normal ACK may also be used.

Some S-TXOP parameters may be configured for all the STAs in the BSS, such as maximum/minimum durations per slot, configuration options for slots (e.g., short trigger vs regular trigger for UL slots). Such configurations may be included in beacon frames or probe response frames.

Figure 4B:
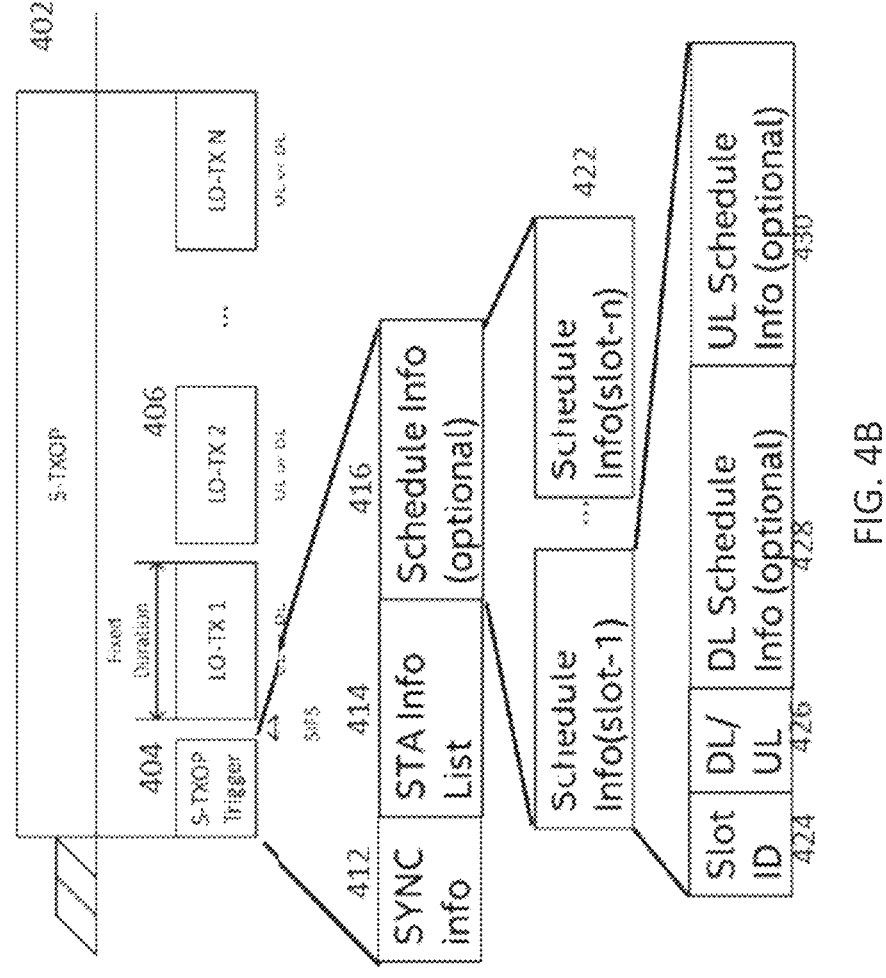
FIG. 4B illustrates S-TXOP initial configuration and resource allocation signaling, in accordance with some embodiments.

FIG. 4B illustrates S-TXOP Initial Configuration and Resource Allocation signaling, in accordance with some embodiments.

The SYNC info field 412 enables PHY level synchronization.

STA Info List 414: For each STA that is going to be addressed in this S-TXOP the following information is included:

The AID.

The slots these STAs are going to participate in, signaled as:

Bitmap or index of a feasible allocation configured apriori (e.g., during r-TWT setup).

2 bits to signal if semi-static config is enabled, disabled one or if configuration continues from previous S-TXOP.

Schedule Info 416 contains a list 422 of schedule information for a subset of slots including:

Slot ID 424

DL/UL bit 426 or a 2 bit DL/UL/flexible signaling.

Scheduling IE for DL, UL or P2P:

The DL Schedule Info 428 contains equivalent of/compressed U-SIG+EHT-SIG information that's carried in MU PPDU.

UL Schedule Info 430 contains equivalent of/compressed Basic Trigger Frame information.

Some optimizations can be done e.g., by using index of the STA in the STA Info list instead of AID, getting rid of information that's not useful.

No Schedule Info if corresponding to a slot in which only STAs that are configured in semi-static fashion participate.

No DL Schedule Info or UL schedule info if the config is known apriori.

For transmission in slots that are not mentioned in Schedule Info the resource allocation is signaled in the slot (e.g., via a U-SIG or equivalent for DL and TF or short TF in UL).

Figure 4C:
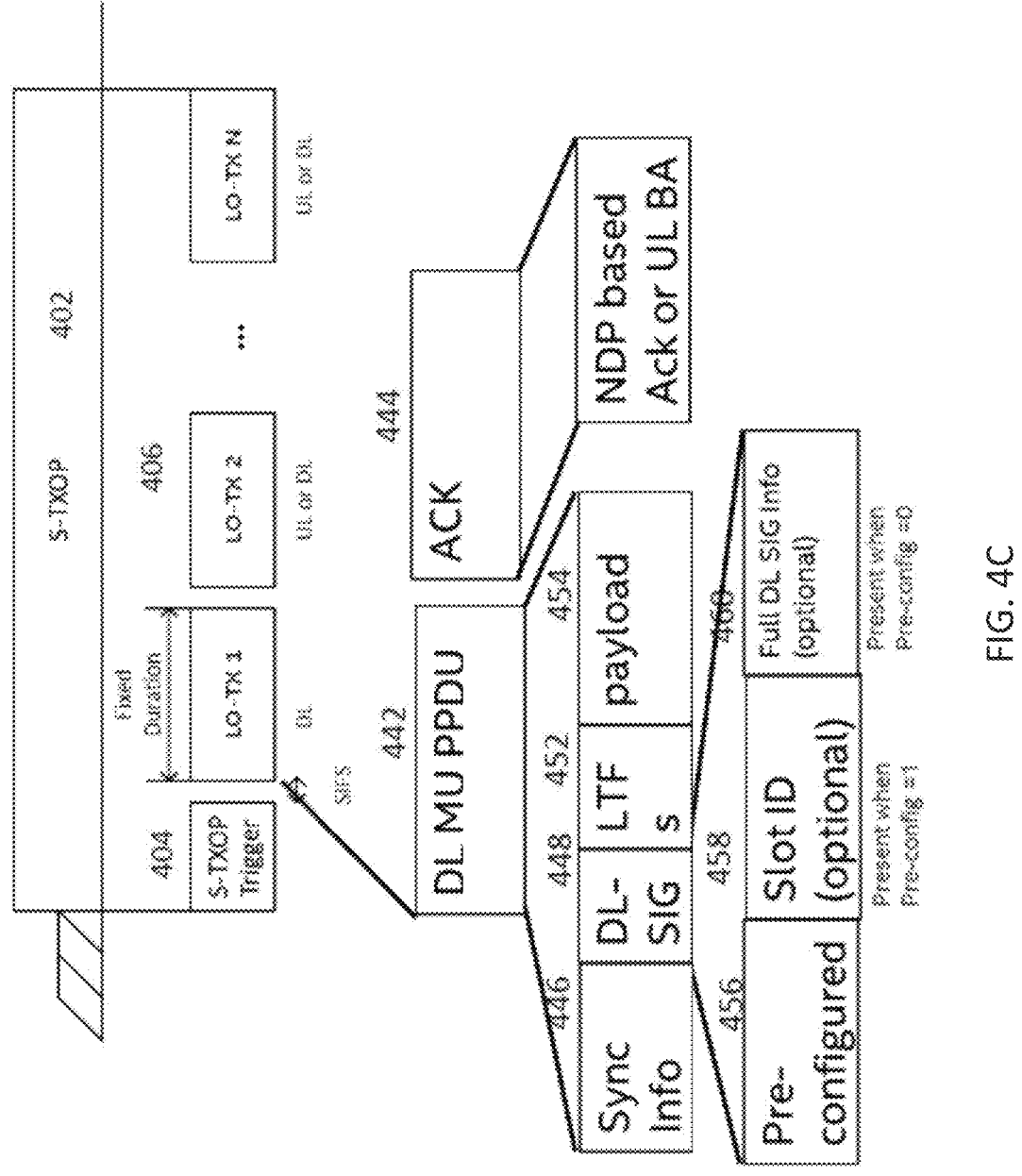
FIG. 4C illustrates an S-TXOP downlink (DL) slot configuration, in accordance with some embodiments.

FIG. 4C illustrates an S-TXOP DL Slot Configuration, in accordance with some embodiments. The SYNC info field 446 enables PHY level synchronization for the DL slot that includes DL MU PPDU 442. In a given slot for a DL transmission a Pre-Configured Bit 456 is included in the DL-SIG 448. If the bit is set to 1, then this signals the allocation was done apriori and the Slot ID field 458 is present as reference to the exact resource allocation. Otherwise, the complete resource allocation information that would typically be present in a baseline DL PPDU (or equivalent) is included (as field 460).

In some embodiments, for a DL slot, the DL MU PPDU 442 may be encoded to include a synchronization field 446 prior to the DL-SIG 448, an LTF 452 following the DL-SIG 448 followed by a payload 454, although the scope of the embodiments is not limited in this respect. ACK 444 may follow the DL MU PPDU 442.

Figure 4D:
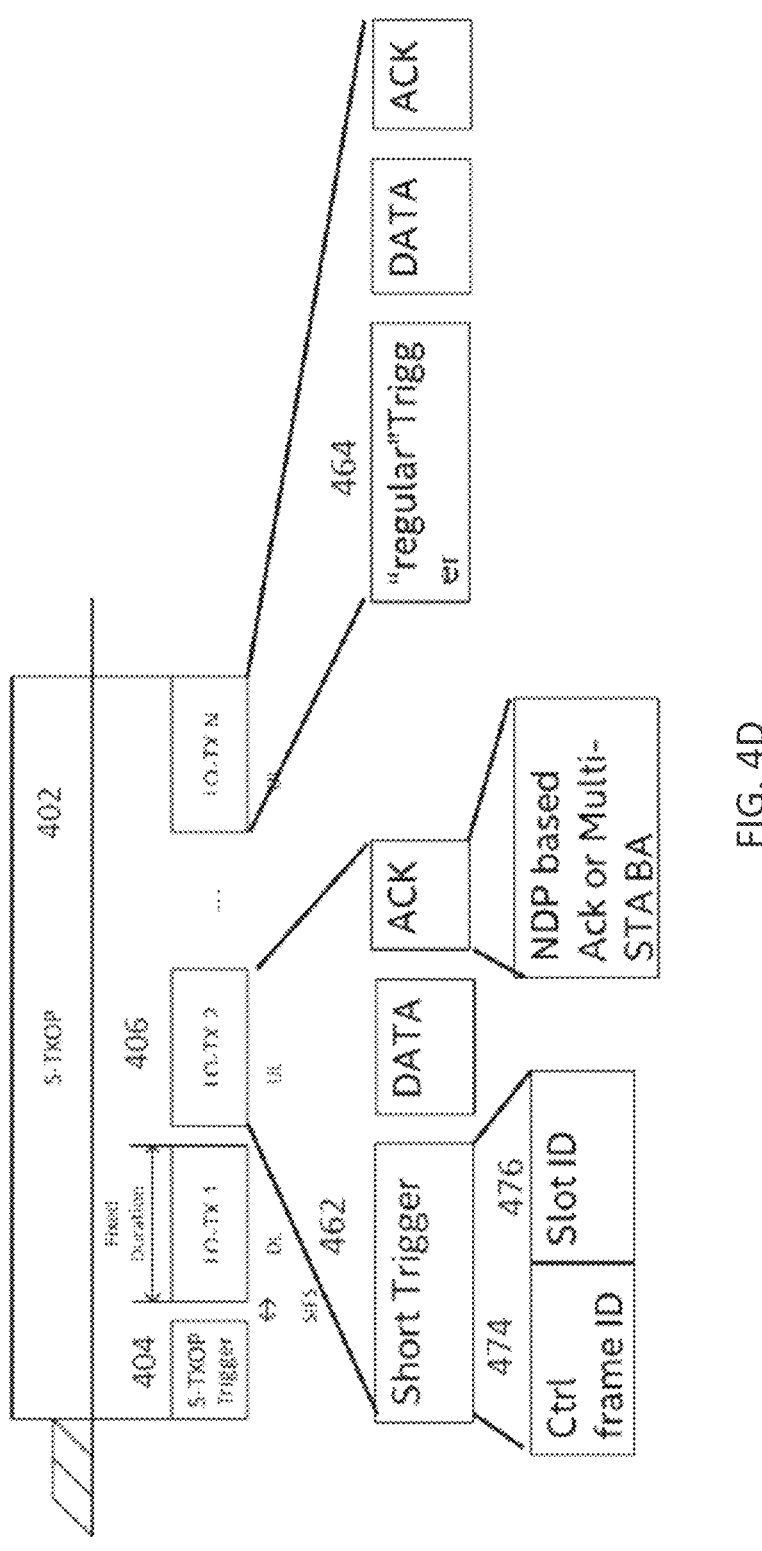
FIG. 4D illustrates an S-TXOP uplink (UL) slot configuration, in accordance with some embodiments.

FIG. 4D illustrates an S-TXOP UL Slot Configuration, in accordance with some embodiments. In a given slot for a UL transmission either a Short Trigger 462 is included if the allocation was signaled apriori or a regular Trigger frame 464 otherwise. The Short Trigger can be a new Ctrl frame 474 or a new NDP PPDU. It contains a Slot ID 476 which acts as a pointer to the exact resource allocation.

Figure 5A:
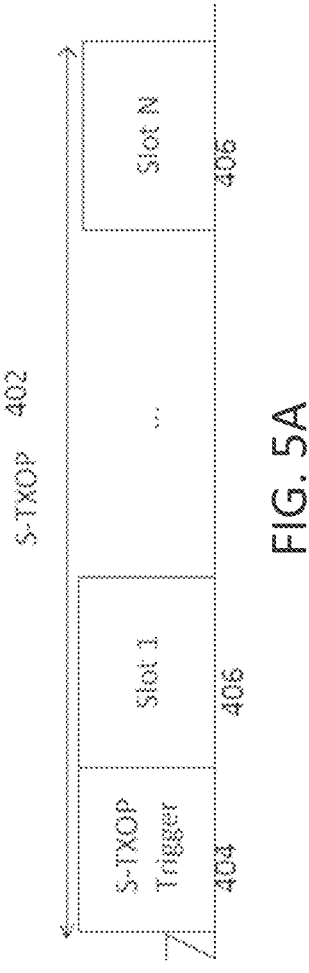
FIG. 5A is a high-level illustration of an S-TXOP, in accordance with some embodiments.

FIG. 5A illustrates a synchronized transmission opportunity (S-TXOP), in accordance with some embodiments. As shown in FIG. 5A, S-TXOP 402 may include an S-TXOP trigger 404 followed by a plurality of time-slots 406, which may be referred to as S-TXOP slots. In these embodiments, the S-TXOP Trigger 404 may inform each STA in which slot of that TXOP to expect a frame with allocation meant for the STA. This allows a STA to prepare their PHY and TX state machines ahead of time. In the actual slot 406, the AP sends the corresponding PPDU with the allocation index which, confirms of the allocation. In this way, it may be easier for the state machine to find its allocation with an explicit signaling rather than interpreting based on slot length itself. These embodiments are discussed in more detail below. The use of an allocation index in the slot may also allow the assignment of multiple allocations to same slot, although the scope of the embodiments is not limited in this respect.

Figure 5B:
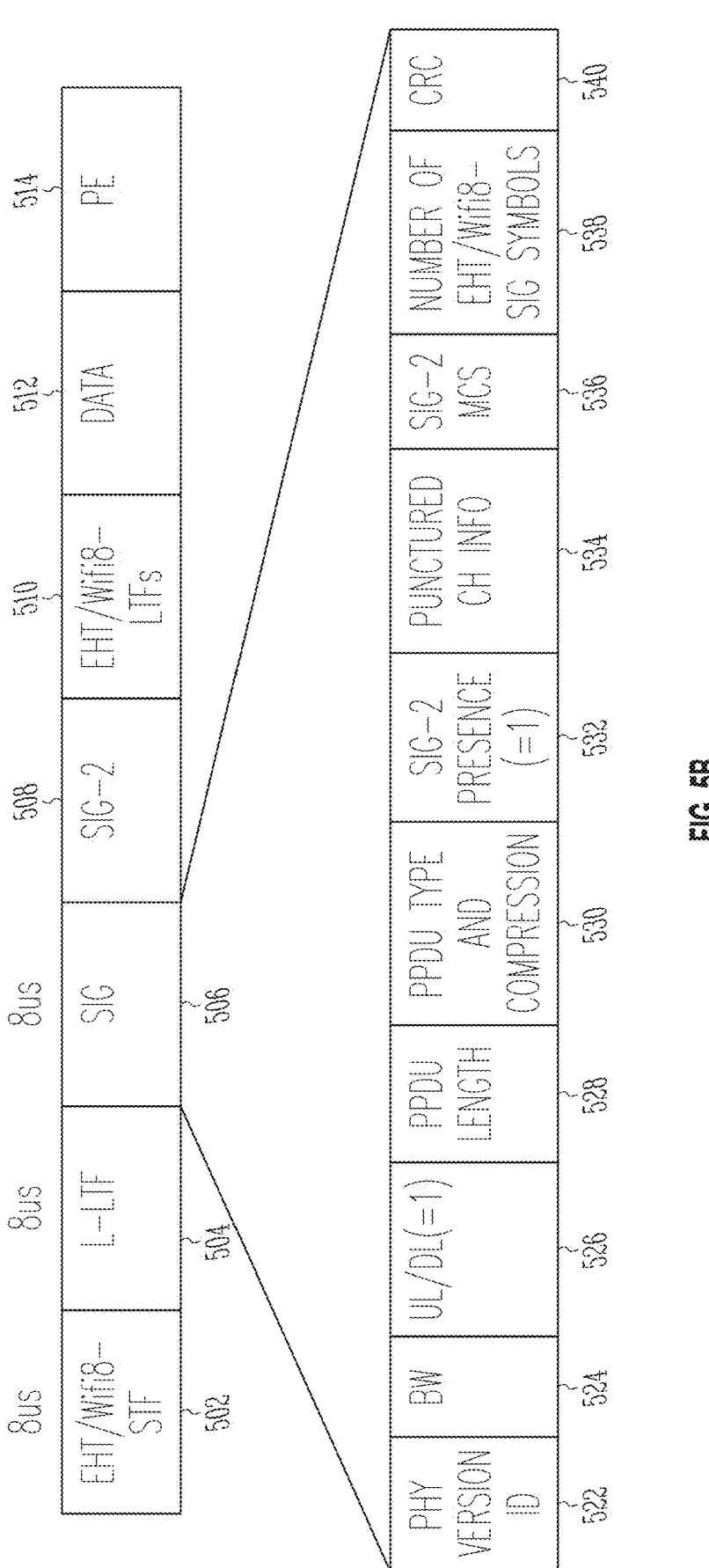
FIG. 5B illustrates a DL multi-user physical layer protocol data unit (MU PPDU) with a lite preamble that includes an additional signal field (SIG) and channel estimates, in accordance with some embodiments.
Figures 5C, 5D:
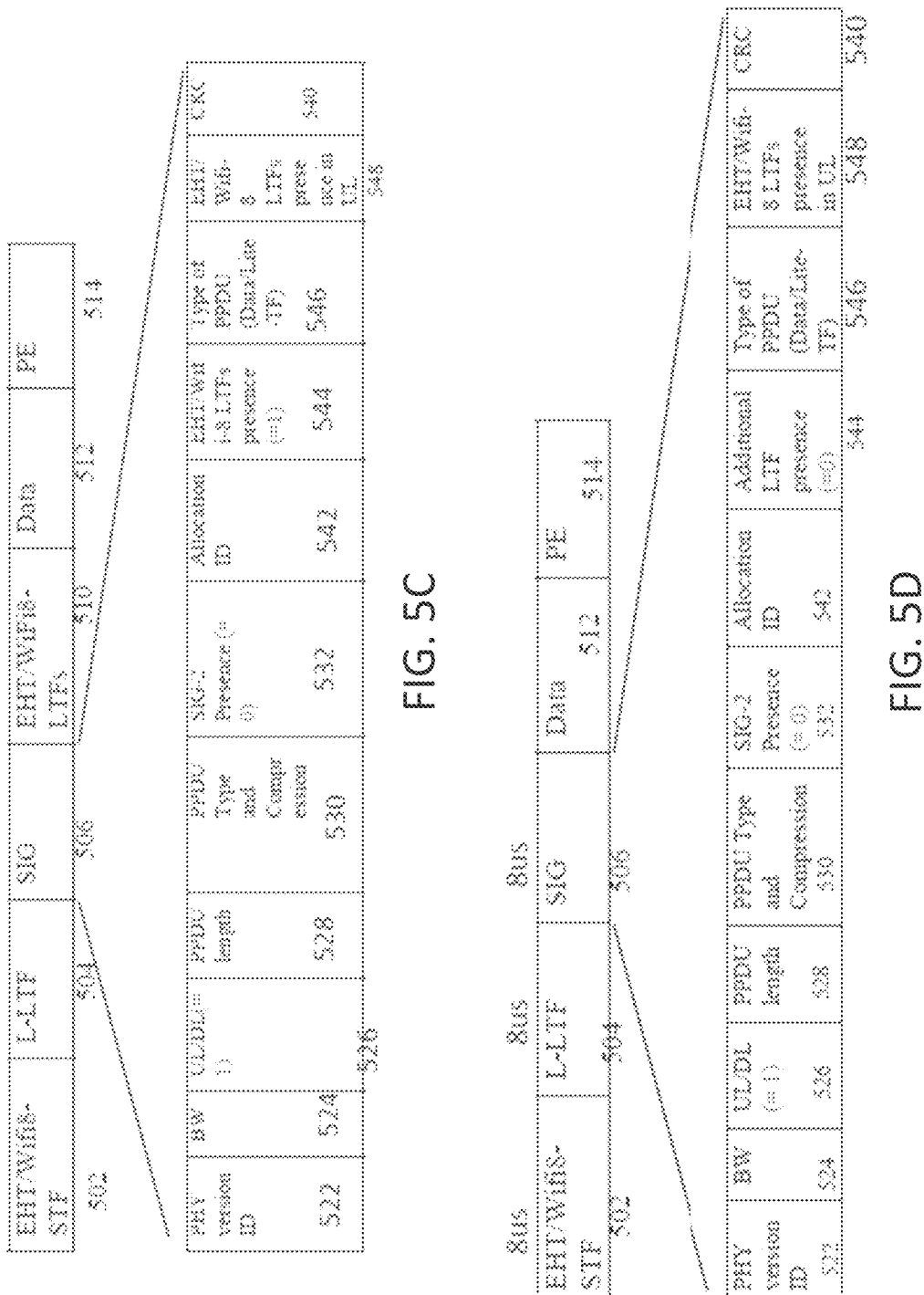
FIG. 5C illustrates a DL MU PPDU with a lite preamble that includes fields for channel estimate without an additional SIG, in accordance with some embodiments.
FIG. 5D illustrates a DL MU PPDU with a lite preamble that does not include additional fields for channel estimates or an additional SIG, in accordance with some embodiments.
Figures 5E, 5F:
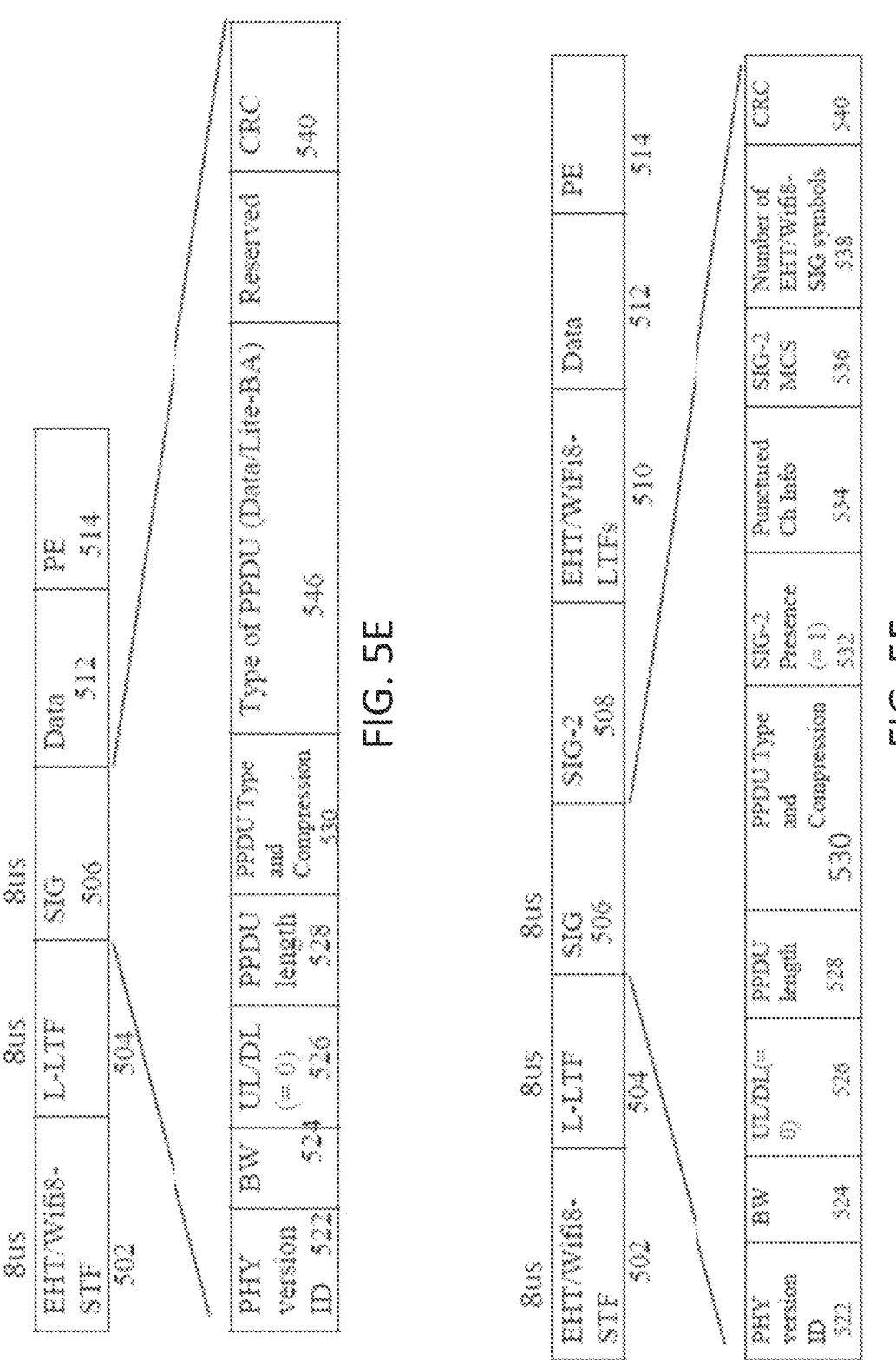
FIG. 5E illustrates an UL MU PPDU with a lite preamble that may be sent in response to a trigger frame (TF) or a lite-TF that does not include additional fields for channel estimates or an additional SIG, in accordance with some embodiments.
FIG. 5F illustrates an UL MU PPDU with a lite preamble that includes an additional SIG and fields for channel estimates, in accordance with some embodiments.

FIG. 5B illustrates a DL MU PPDU with a lite preamble that includes additional SIG and channel estimates, in accordance with some embodiments. FIG. 5C illustrates a DL MU PPDU with a lite preamble that includes fields for MIMO channel estimate but no additional SIG, in accordance with some embodiments. FIG. 5D illustrates a DL MU PPDU with a lite preamble that includes neither additional fields for MIMO channel estimate nor an additional sig, in accordance with some embodiments. FIG. 5E illustrates an UL MU PPDU with a lite preamble sent in response to a TF or Lite-TF that includes neither additional fields for MIMO channel estimate nor an additional sig, in accordance with some embodiments. FIG. 5F illustrates an UL MU PPDU with a lite preamble that includes additional SIG and channel estimates, in accordance with some embodiments. As illustrated in FIGS. 5B-5F, a MU-PPDU may include a short-training field (STF) 502, a legacy long training field (L-LTF) 504, a signal field (SIG) 506, and one or more other fields including a second signal field (SIG-2) 508, a field 510 for additional LTFs, a data field 512 and a packet extension (PE) field 514, depending on the PPDU. As further illustrated in FIGS. 5B-5F, SIG 506 may include various fields depending on the PPDU, some of which may be repurposed as described herein. For example, SIG 506 may include PHY version ID field 522, BW field 524, UL/DL indicator field 524, PPDU length field 526 and PPDU Type and Compression field 530. SIG 506 may also include one or more of the following fields: SIG-2 presence field 532, puncture channel information field 534, SIG-2 MCS field 536, number of SIG symbols field 538, cyclic-redundancy check (CRC) field 540, allocation ID field 542, LTFs presence field 544, Type of PPDU field (Data/Lite TF) 546, LTFs presence in UL field 548 (see FIGS. 5B-5F).

Figure 5G:
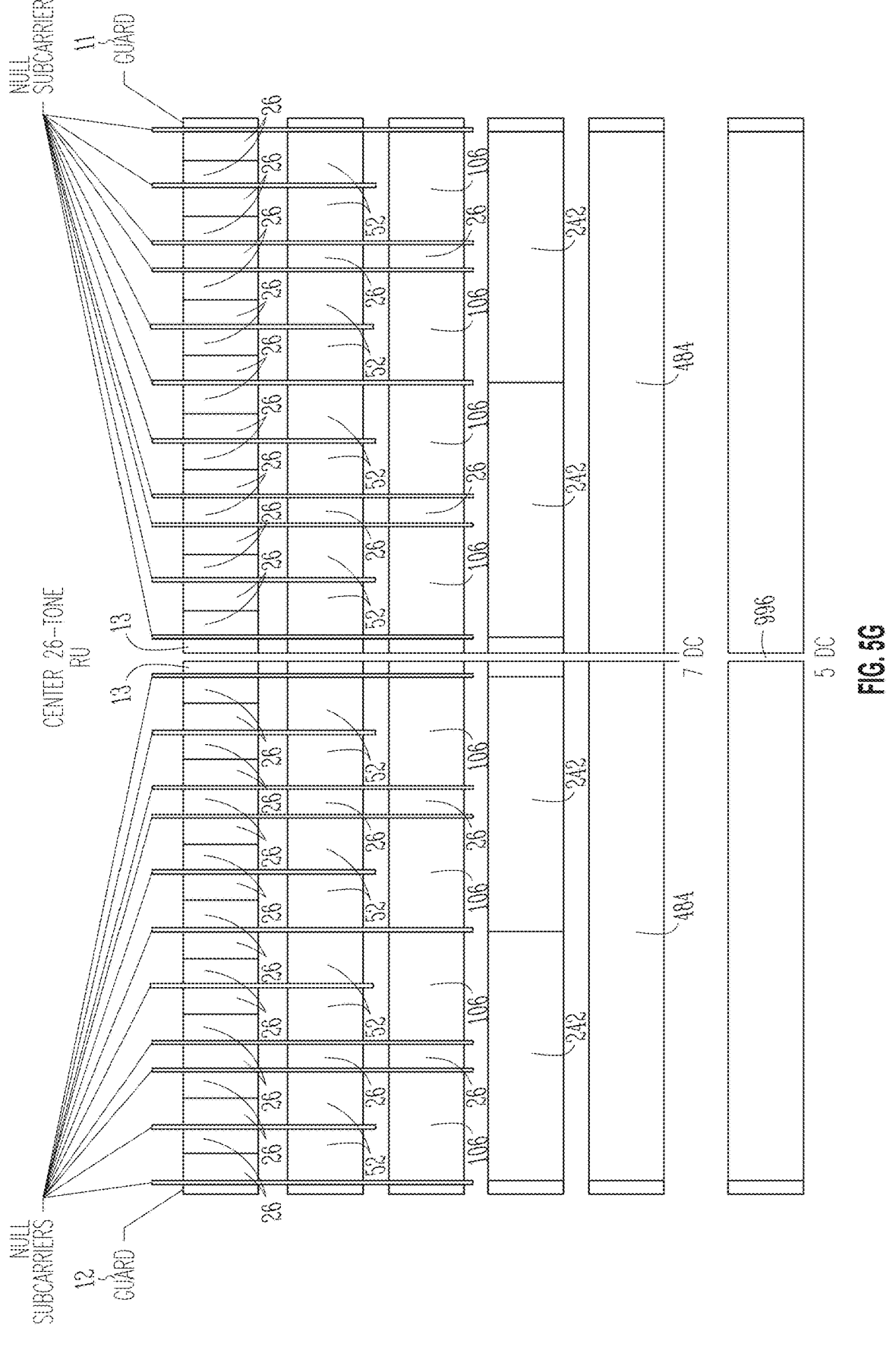
FIG. 5G illustrates resource unit (RU) locations in an example 80 MHz PPDU, in accordance with some embodiments.

FIG. 5G illustrates resource unit (RU) locations in an 80 MHz PPDU, in accordance with some embodiments. Any one or more of the RUs illustrated in FIG. 5G may be allocated to one or more STAs for use during a S-TXOP for an 80 MHZ PPDU. Other bandwidth PPDUs are also suitable for use.

FIG. 5A shows a high-level S-TXOP design wherein an S-TXOP Trigger frame 404 is transmitted upfront in the TXOP 402 that contains scheduling information for transmissions within slots 406 of the remaining TXOP. Within each slot 406 the following optimizations are provided:

DL MU PPDUs transmitted without any EHT-SIG-B with the allocation information being assumed to be known apriori.

UL MU PPDUs are solicited by a lightweight PPDU ("lite-TF") that performs the same function as a Basic TF but without the associated overhead.

For other transmissions, PPDUs may contain the allocation but not have the legacy preamble.

Embodiments disclosed herein provide, among other things, a flexible preamble design for PPDUs for use in S-TXOP slots that addresses various items. For example, within an S-TXOP slot some of the PPDUs may contain data for isochronous traffic while others may contain data for other traffic that requires scheduling on demand. While a semi-static allocation can be used for the former, for the latter type this may not be possible. Some embodiments optimize the overhead to enable ultra-low latency (e.g., 100 μsec) with high efficiency. Embodiments disclosed herein provide a flexible design for lite preamble that can be used for signaling both types of traffic.

Some embodiments disclosed herein provide a unified lite preamble design, the length and content of which may vary based on the information it's expected to carry, whether channel estimate is performed based on a history, complete or partial resource allocation is provided in the PPDU etc. These embodiments are described in more detail herein. In these embodiments, the lite preamble contains a fixed part and one or more optionally present fields.

In some embodiments, the fixed part of a lite preamble contains a SYNC field for packet detection, AGC setting and fine CFO correction.

In some embodiments, the SYNC field may include a subfield for packet detection, AGC setting and a separate subfield for fine CFO correction. For example, the first field may be an L-STF in which case it can be used for coarse CFO correction as well. The first field may be the EHT-STF or its WiFi-8 equivalent. Cyclic shifts may also be applied to the field. The second subfield may be an L-LTF and used for fine CFO correction. The second subfield may be a 2× EHT-LTF.

In some embodiments, the fixed part of the lite preamble may contain a SIG field the content of which determines the content of the remaining parts of the preamble as follows and may, for example, be based on the U-SIG design. The SIG field may contain information such as BW, UL/DL signaling, PPDU duration. A version ID field may be used to differentiate the WiFi-8 PPDU from a later version. One bit to signal if additional SIG field may be present (e.g., to signal per-user allocation in a DL MU PPDU).

In some embodiments, one or more fields may be used to signal what type of PPDUs it is. For example, for DL PPDUs a field may be used to signal whether the PPDU contains Data frames or is a lite-TF or lite-BA. For UL PPDUs, one or more fields may be used to signal whether the PPDU contains data frames or is an UL BA.

In some embodiments, if additional SIG information is not present, some fields may be repurposed to signal an Allocation ID and whether additional LTFs for channel estimates are present. The Allocation ID serves as a pointer to a particular allocation to be used for this PPDU (if DL MU) or for the response PPDU (if it's a DL PPDU soliciting UL MU response).

In some embodiments, when no fields are provided for channel estimate in the PPDU, channel estimate for this PPDU may be performed using the estimates for an earlier PPDU covering the same RU, NSS and BW configuration. For example, in the DL this may be done by using the channel estimate in the S-TXOP Trigger frame. In the UL or the DL, a first PPDU transmitted using a pre-known allocation may include the fields required for channel estimation which can then be used for the same allocation in remaining slots of the S-TXOP. In order to reuse the channel estimations from an earlier PPDU, AGC setting would not need to be changed between the earlier PPDU and the later PPDU that reuse the channel estimations.

In some embodiments, the number of spatial streams estimated in the earlier PPDU may be the same as the later PPDU that reuse the channel estimations. In some embodiments, when there are no fields included in SYNC part for MIMO AGC setting (e.g., EHT-STF) then those fields may be included after the SIG field(s).

In some embodiments, inside an S-TXOP slot, an AP or STA may transmit PPDUs with a full allocation but with lower overhead than baseline PPDUs.

In some embodiments, the Lite-TF and/or the Basic TF may contain signaling to require channel estimate fields in the response PPDU. For example, the Basic TF may contain a Special User Info field or a Reserved bit to carry this info.

In some embodiments, whether the response to a Lite-TF and/or the Basic TF contains signaling to require channel estimate fields in the response PPDU may be specified or signaled as part of the allocation information. For example, a STA may be required to transmit fields used for MIMO channel estimates in the first PPDU transmitted using a given allocation in the S-TXOP.

As used herein, the term "full allocation" refers to the allocation typically present in a conventional EHT SIG-B is included.

FIG. 5B shows an example DL MU PPDU format with the lite preamble design when the part after SIG field includes EHT/WiFi8-LTF fields for MIMO channel estimate and additional SIG. Packet detection and AGC may be performed using a field similar to EHT-STF or the STFs to be used in regular WiFi-8 PPDUs. CFO correction may be performed using the L-LTF fields. Since the SIG-2 field is present, it is assumed that EHT/WiFi8-LTFs are also present. This frame may be used typically for carrying DL Data, although the scope of the embodiments is not limited in this respect.

FIG. 5C shows an example DL MU PPDU format with the lite preamble design when the part after the SIG field includes fields for MIMO channel estimate but no additional SIG. Note that if the Data/Lite-TF field signals the PPDU carries Data, then the allocation ID may signal the allocation to be used for parsing the rest of this PPDU. Otherwise, the allocation ID refers to the allocation to be used in response UL MU PPDU following the transmission of the current PPDU which may be transmitted in non-OFDMA fashion. Whether the response PPDU in the latter case contains any fields for channel estimate may be signaled using the "EHT/Wifi-8 LTFs presence in UL" subfield.

FIG. 5D shows an example DL MU PPDU format with the lite preamble design when the part after SIG field includes neither additional fields for MIMO channel estimate nor an additional sig. This optimized preamble design may be used with semi-static allocations to enable the ultra-low latency with high efficiency within the S-TXOP.

FIG. 5E shows an example format of an UL MU PPDU, which may be sent as response to a TF or Lite-TF, with the lite preamble design, when the part after SIG field includes neither additional fields for MIMO channel estimate nor an additional sig.

FIG. 5F shows an example UL MU PPDU format with the lite preamble design when the part after SIG field includes EHT/WiFi8-LTF fields for MIMO channel estimate and additional SIG. Since the SIG-2 field is present, it is assumed that EHT/WiFi8-LTFs are also present. This frame may be used typically for carrying UL Data from one user after being allocated time opportunistically within the S-TXOP, although the scope of the embodiments is not limited in this respect.

In some embodiments, an access point station (AP) 102 (FIG. 1A) may be configured for communicating with a plurality of non-AP stations (STAs) (e.g., user devices 120 (FIG. 1A)) within a synchronized transmission opportunity (S-TXOP) 402 (see FIGS. 5A-5F). The S-TXOP may comprise an S-TXOP trigger 404 followed by a plurality of S-TXOP slots 406. In these embodiments, after transmission of the S-TXOP trigger by the AP, the AP may encode, for transmission within an S-TXOP slot 406 of the S-TXOP 402, a downlink (DL) multi-user physical layer protocol data unit (DL MU-PPDU). The DL MU-PPDU may be encoded to include a preamble followed by a data field 512. In these embodiments, to indicate that a previously signaled resource unit (RU) allocation is to be used during the S-TXOP slot, the AP may encode the preamble to include an allocation ID 542 of the previously signaled RU allocation in a signal field (SIG) 506 of the preamble and a SIG-2 presence indicator 532 to indicate that a second signal field (SIG-2) 508 is not included in the preamble of the DL MU-PPDU. In these embodiments, the previously signaled RU allocation is signaled via the S-TXOP trigger. An example of this is illustrated in FIG. 5D which shows a lite preamble for a DL MU PPDU. In these embodiments, an optimized preamble design is used with semi-static allocations to enable the ultra-low latency with high efficiency within the S-TXOP.

In some embodiments, to indicate that a new RU allocation is to be used during the S-TXOP slot, the AP may encode the SIG-2 presence indicator 532 to indicate that the SIG-2 508 is included in the preamble of the DL MU-PPDU and may encode the SIG-2 508 for transmission in the DL MU-PPDU following the SIG 506. The SIG-2 may be encoded to contain the new RU allocation. In these embodiments, the preamble may be a lite preamble with an additional SIG field (SIG-2). An example of this is illustrated in FIG. 5B. In these embodiments, the SIG 506 may be encoded to indicate whether or not the SIG-2 508 is included in the DL MU-PPDU.

In some embodiments, when the previously signaled RU allocation is to be used during the S-TXOP slot (i.e., the SIG-2 presence indicator 532 indicates that the SIG-2 508 is not included) and when MIMO channels estimates from a prior slot are to be used for reception of the DL MU-PPDU by the assigned STAs, the AP may encode the SIG 506 to indicate in field 544 that additional training fields 510 are not present in the DL MU-PPDU. An example of this is illustrated in FIG. 5D In some embodiments, when the previously signaled RU allocation is to be used during the S-TXOP slot, and when new MIMO channel estimates are to be determined for use during reception of the DL MU-PPDU during the S-TXOP slot, the AP may encode the SIG 506 to indicate in field 544 that additional training fields 510 are present in the DL MU-PPDU and may encode the DL MU-PPDU to include additional training fields 510 for transmission after the SIG 506 and before the data field 512. In these embodiments, field 544 may be used to indicate whether or not additional training fields 510 are present in the DL MU-PPDU. An example of this is illustrated in FIG. 5C.

In some embodiments, when the SIG-2 presence indicator 532 indicates that the SIG-2 508 is not included, the AP may encode the SIG 506 to further include a field 546 that indicates whether the DL MU-PPDU is a data frame or a trigger frame. Examples of this are illustrated in FIG. 5C and FIG. 5D.

In some embodiments, when the new RU allocation is to be used during the S-TXOP slot (i.e., the SIG-2 presence indicator 532 indicates that the SIG-2 508 is included), the AP may refrain from including a field 544 in the SIG 506 that indicates whether or not additional training fields 510 are present in the DL MU-PPDU (i.e., additional training fields 510 are assumed to be present when a new allocation is to be used so field 544 is not necessary). The AP may also encode the SIG 506 to include a field 538 that indicates a number of symbols of the SIG-2 508. In these embodiments, when the SIG-2 508 is to be included in the DL MU-PPDU, the DL MU-PPDU may be encoded to include additional training fields 510 (e.g., WiFi8 or EHT-LTFs) following the SIG-2 508. An example of this is illustrated in FIG. 5B.

In some embodiments, when the SIG-2 presence indicator 532 is encoded to indicate that the SIG-2 508 is not included in the DL MU-PPDU, the AP may refrain from including the SIG-2 508 in the DL MU-PPDU (see FIGS. 5C and 5D). In these embodiments, when the SIG-2 presence indicator 532 is encoded to indicate that the SIG-2 508 is included in the DL MU-PPDU, the AP may refrain from including the allocation ID 542 in the SIG 506 (see FIG. 5B). In these embodiments, the SIG-2 508 is not transmitted as part of the DL MU-PPDU when a previously signalling RU allocation is to be used during the S-TXOP slot. In these embodiments, the SIG 506 does not include an allocation ID when a new RU allocation, signaled by the SIG-2 508, is to be used during the S-TXOP slot.

In some embodiments, for reception of an uplink (UL) MU-PPDU during one of the S-TXOP slots 406 of the S-TXOP 402, the AP may decode a preamble of the UL MU PPDU followed by a data field 512 of the UL MU PPDU. The preamble may comprise the SIG 506. In these embodiments, when the SIG 506 includes a SIG-2 presence indicator 532 indicating that the UL MU PPDU includes a SIG-2 field, the AP may decode the SIG-2 field to determine a new RU allocation for use during the current S-TXOP slot and process a plurality of LTFs 510 that follow the SIG-2 508 to determine MIMO channel estimates for use in decoding the data field 512. In these embodiments, the SIG-2 508 may immediately follow the SIG 506. In these embodiments, the plurality of LTFs 510 may immediately follow the SIG-2 508. An example of this is illustrated in FIG. 5F.

In some embodiments, for reception of an UL MU PPDU that is received in response to a trigger frame (TF), the AP may decode a PPDU type field 546 of the SIG 506 to determine whether the UL MU-PPDU includes data or a block acknowledge (BA). The AP may also decode a data field 512 that immediately follows the SIG 506. In these embodiments, neither a SIG-2 field nor plurality of LTFs 510 are included in the UL MU-PPDU, and example of which is illustrated in FIG. 5E.

In some embodiments, AP may comprise processing circuitry which may comprise a baseband processor, and a plurality of antennas, as described herein.

Some embodiments are directed to non-transitory computer-readable storage medium that stores instructions for execution by processing circuitry of an access point station (AP). In these embodiments, for communicating with a plurality of non-AP stations (STAs) within a synchronized transmission opportunity (S-TXOP) 402, after transmission of the S-TXOP trigger by the AP, the processing circuitry may encode, for transmission within an S-TXOP slot 406 of the S-TXOP 402, a downlink (DL) multi-user physical layer protocol data unit (DL MU-PPDU). The DL MU-PPDU may be encoded to include a preamble followed by a data field 512. In these embodiments, to indicate that a previously signaled resource unit (RU) allocation is to be used during the S-TXOP slot, the processing circuitry may encode the preamble to include an allocation ID 542 of the previously signaled RU allocation in a signal field (SIG) 506 of the preamble and a SIG-2 presence indicator 532 encoded to indicate that a second signal field (SIG-2) 508 is not included in the preamble of the DL MU-PPDU. In these embodiments, the previously signaled RU allocation may be signaled via the S-TXOP trigger.

Some embodiments are directed to non-access point station (STA) configured for communicating with an access point station (AP) within a synchronized transmission opportunity (S-TXOP) 402. In these embodiments, after reception of the S-TXOP trigger from the AP, the STA may decode, within an S-TXOP slot 406 of the S-TXOP 402, a downlink (DL) multi-user physical layer protocol data unit (DL MU-PPDU). The DL MU-PPDU may include a preamble followed by a data field 512. In these embodiments, the STA may determine that a previously signaled resource unit (RU) allocation is to be used during the S-TXOP slot when the preamble includes an allocation ID 542 of the previously signaled RU allocation in a signal field (SIG) 506 of the preamble and a SIG-2 presence indicator 532 that indicates that a second signal field (SIG-2) 508 is not included in the preamble of the DL MU-PPDU. In these embodiments, the previously signaled RU allocation may have been signaled via the S-TXOP trigger.

In some embodiments, the STA may determine that a new RU allocation is to be used during the S-TXOP slot when the SIG-2 presence indicator 532 indicates that the SIG-2 508 is included in the preamble of the DL MU-PPDU and may decode the SIG-2 508 in the DL MU-PPDU following the SIG 506, the SIG-2 containing the new RU allocation.

FIG. 6 illustrates a functional block diagram of a wireless communication device, in accordance with some embodiments. In one embodiment, FIG. 6 illustrates a functional block diagram of a communication device (STA) that may be suitable for use as an AP STA, a non-AP STA or other user device in accordance with some embodiments. The communication device 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 600 may include communications circuitry 602 and a transceiver 610 for transmitting and receiving signals to and from other communication devices using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication device 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication device 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 600 may include one or more of a keyboard, a display, a non-volatile memory port, multiple antennas, a graphics processor, an application processor, speakers, and other mobile device elements. The display may be an LCD screen including a touch screen.

Although the communication device 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 600 may refer to one or more processes operating on one or more processing elements.

In some embodiments, a physical layer protocol data unit may be a physical layer conformance procedure (PLCP)

protocol data unit (PPDU). In some embodiments, the AP and STAs may communicate in accordance with one of the IEEE 802.11 standards. IEEE 802.11-2016 is incorporated herein by reference. IEEE P802.11-REVmd/D2.4, August 2019, and IEEE draft specification IEEE P802.11ax/D5.0, October 2019 are incorporated herein by reference in their entireties. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

The following patent applications are incorporated by reference:

PCT/US2017/067134, Filed Dec. 18, 2017, Published Jun. 27, 2019 as WO2019/125396, and entitled "ENHANCED TIME SENSITIVE NETWORKING FOR WIRELESS COMMUNICATIONS";

PCT/US2018/035868, Filed Jun. 4, 2018, Published Dec. 12, 2019 as WO2019/236052, entitled "METHODS AND APPARATUS TO FACILITATE A SYNCHRONOUS TRANSMISSION OPPORTUNITY IN A WIRELESS LOCAL AREA NETWORK";

U.S. Ser. No. 16/870,156, Filed May 8, 2020, Published as US2020-0267636 A1, entitled "EXTREME HIGH THROUGHPUT (EHT) TIME-SENSITIVE NETWORKING".

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point station (AP), the apparatus comprising:

processing circuitry; and memory, wherein for communicating with a plurality of non-AP stations (STAs) within a synchronized transmission opportunity (S-TXOP), the S-TXOP comprising an S-TXOP trigger followed by a plurality of S-TXOP slots, each of the S-TXOP slots comprising a non-overlapping time period within the S-TXOP to allow for time-synchronized communications with the STAs, wherein after transmission of the S-TXOP trigger, the processing circuitry is configured to:

encode, for transmission within a first of the S-TXOP slots, a downlink (DL) multi-user physical layer protocol data unit (DL MU-PPDU), the DL MU-PPDU encoded to include a preamble followed by a data field, wherein to indicate that a previously signaled resource unit (RU) allocation is to be used during the S-TXOP slot, the processing circuitry is configured to encode the preamble to include:

an allocation ID of the previously signaled RU allocation in a signal field (SIG) of the preamble; and a SIG-2 presence indicator encoded to indicate that a second signal field (SIG-2) is not included in the preamble of the DL MU-PPDU, wherein the previously signaled RU allocation is signaled via the S-TXOP trigger, and wherein when the previously signaled RU allocation is to be used during the S-TXOP slot, the processing circuitry is configured to encode the SIG to indicate whether or not additional training fields are present in the DL MU-PPDU.

2. The apparatus of claim 1, wherein to indicate that a new RU allocation is to be used during the S-TXOP slot, the processing circuitry is configured to:

encode the SIG-2 presence indicator to indicate that the SIG-2 is included in the preamble of the DL MU-PPDU; and encode the SIG-2 for transmission in the DL MU-PPDU following the SIG, the SIG-2 encoded to contain the new RU allocation.

3. The apparatus of claim 2, wherein when the previously signaled RU allocation is to be used during the S-TXOP slot and when channel estimates from a prior slot are to be used, the processing circuitry is configured to:

encode the SIG to indicate that the additional training fields are not present in the DL MU-PPDU.

4. The apparatus of claim 2, wherein when the previously signaled RU allocation is to be used during the S-TXOP slot, and when new channel estimates are to be determined for use during reception of the DL MU-PPDU during the S-TXOP slot, the processing circuitry is configured to:

encode the SIG to indicate that the additional training fields are present in the DL MU-PPDU; and encode the DL MU-PPDU to include the additional training fields for transmission after the SIG and before the data field.

5. The apparatus of claim 2, wherein when the SIG-2 presence indicator is encoded to indicate that the SIG-2 is not included in the DL MU-PPDU, the processing circuitry is configured to refrain from including the SIG-2 in the DL MU-PPDU, and wherein when the SIG-2 presence indicator is encoded to indicate that the SIG-2 is included in the DL MU-PPDU, the processing circuitry is configured to refrain from including the allocation ID in the SIG.

6. The apparatus of claim 1, wherein the processing circuitry comprises a baseband processor, wherein the AP comprises a plurality of antennas, and wherein the memory is configured to store the preamble.

7. An apparatus of an access point station (AP), the apparatus comprising:

processing circuitry; and memory, wherein for communicating with a plurality of non-AP stations (STAs) within a synchronized transmission opportunity (S-TXOP), the S-TXOP comprising an S-TXOP trigger followed by a plurality of S-TXOP slots, wherein after transmission of the S-TXOP trigger, the processing circuitry is configured to:

encode, for transmission within an S-TXOP slot of the S-TXOP, a downlink (DL) multi-user physical layer protocol data unit (DL MU-PPDU), the DL MU-PPDU encoded to include a preamble followed by a data field, wherein to indicate that a previously signaled resource unit (RU) allocation is to be used during the S-TXOP slot, the processing circuitry is configured to encode the preamble to include:

an allocation ID of the previously signaled RU allocation in a signal field (SIG) of the preamble; and a SIG-2 presence indicator encoded to indicate that a second signal field (SIG-2) is not included in the preamble of the DL MU-PPDU, wherein the previously signaled RU allocation is signaled via the S-TXOP trigger, wherein to indicate that a new RU allocation is to be used during the S-TXOP slot, the processing circuitry is configured to:

encode the SIG-2 presence indicator to indicate that the SIG-2 is included in the preamble of the DL MU-PPDU; and encode the SIG-2 for transmission in the DL MU-PPDU following the SIG, the SIG-2 encoded to contain the new RU allocation, wherein when the SIG-2 presence indicator indicates that the SIG-2 is not included, the processing circuitry is configured to encode the SIG to further include a field that indicates whether the DL MU-PPDU is a data frame or a trigger frame.

8. An apparatus of an access point station (AP), the apparatus comprising:

processing circuitry; and memory, wherein for communicating with a plurality of non-AP stations (STAs) within a synchronized transmission opportunity (S-TXOP), the S-TXOP comprising an S-TXOP trigger followed by a plurality of S-TXOP slots, wherein after transmission of the S-TXOP trigger, the processing circuitry is configured to:

encode, for transmission within an S-TXOP slot of the S-TXOP, a downlink (DL) multi-user physical layer protocol data unit (DL MU-PPDU), the DL MU-PPDU encoded to include a preamble followed by a data field, wherein to indicate that a previously signaled resource unit (RU) allocation is to be used during the S-TXOP slot, the processing circuitry is configured to encode the preamble to include:

an allocation ID of the previously signaled RU allocation in a signal field (SIG) of the preamble; and a SIG-2 presence indicator encoded to indicate that a second signal field (SIG-2) is not included in the preamble of the DL MU-PPDU, wherein the previously signaled RU allocation is signaled via the S-TXOP trigger, wherein to indicate that a new RU allocation is to be used during the S-TXOP slot, the processing circuitry is configured to:

encode the SIG-2 presence indicator to indicate that the SIG-2 is included in the preamble of the DL MU-PPDU; and encode the SIG-2 for transmission in the DL MU-PPDU following the SIG, the SIG-2 encoded to contain the new RU allocation, wherein when the new RU allocation is to be used during the S-TXOP slot, the processing circuitry is configured to:

refrain from including a field in the SIG that indicates whether or not additional training fields are present in the DL MU-PPDU; and encode the SIG to include a field that indicates a number of symbols of the SIG-2.

9. An apparatus of an access point station (AP), the apparatus comprising:

processing circuitry; and memory, wherein for communicating with a plurality of non-AP stations (STAs) within a synchronized transmission opportunity (S-TXOP), the S-TXOP comprising an S-TXOP trigger followed by a plurality of S-TXOP slots, wherein after transmission of the S-TXOP trigger, the processing circuitry is configured to:

encode, for transmission within an S-TXOP slot of the S-TXOP, a downlink (DL) multi-user physical layer protocol data unit (DL MU-PPDU), the DL MU-PPDU encoded to include a preamble followed by a data field, wherein to indicate that a previously signaled resource unit (RU) allocation is to be used during the S-TXOP slot, the processing circuitry is configured to encode the preamble to include:

an allocation ID of the previously signaled RU allocation in a signal field (SIG) of the preamble; and a SIG-2 presence indicator encoded to indicate that a
  second signal field (SIG-2) is not included in the
  preamble of the DL MU-PPDU,
wherein the previously signaled RU allocation is signaled
  via the S-TXOP trigger,
wherein for reception of an uplink (UL) MU-PPDU during
one of the S-TXOP slots of the S-TXOP, the processing
circuitry is configured to:
  decode a preamble of the UL MU PPDU followed by a
    data field of the UL MU PPDU, the preamble compris-
    ing the SIG,
  wherein when the SIG includes a SIG-2 presence indica-
    tor indicating that the UL MU PPDU includes a SIG-2
    field, the processing circuitry is configured to:
  decode the SIG-2 field to determine a new RU allocation
    for use during the S-TXOP slot;
  process a plurality of long-training fields (LTFs) that
    follow the SIG-2 to determine channel estimates for use
    in decoding the data field,
  wherein the SIG-2 immediately follows the SIG, and
  wherein the plurality of LTFs immediately follow the
    SIG-2.
  10. The apparatus of claim 9, wherein for reception of an
UL MU PPDU that is received in response to a trigger frame
(TF), the processing circuitry is configured to:
  decode a PPDU type field of the SIG to determine whether
    the UL MU-PPDU includes data or a block acknowl-
    edge (BA); and
  decode a data field that immediately follows the SIG.

* * * * *